(12) United States Patent
Willmot

(10) Patent No.: US 6,336,887 B1
(45) Date of Patent: Jan. 8, 2002

(54) DOUBLE ORBITAL TRANSMISSION

(75) Inventor: Eric Paul Willmot, Melba (AU)

(73) Assignee: Aimbridge Pty Ltd., Victoria (AU)

( * ) Notice: Subject to any disclaimer, the term of this patent is extended or adjusted under 35 U.S.C. 154(b) by 0 days.

(21) Appl. No.: 09/530,895

(22) PCT Filed: Nov. 6, 1997

(86) PCT No.: PCT/AU97/00749

§ 371 Date: May 5, 2000

§ 102(e) Date: May 5, 2000

(87) PCT Pub. No.: WO98/22731

PCT Pub. Date: May 28, 1998

(30) Foreign Application Priority Data

Nov. 21, 1996 (AU) .............................................. PO3739
Jul. 21, 1997 (AU) .............................................. PO5235

(51) Int. Cl.[7] .............................. F16H 1/32; F16H 27/00
(52) U.S. Cl. ......................................... 475/178; 74/112
(58) Field of Search ................................ 475/169, 171, 475/174, 175, 178, 14, 16, 296, 336; 74/112, 116, 118, 120, 121, 144, 156, 157, 158

(56) References Cited

U.S. PATENT DOCUMENTS

| 1,717,784 | A | * | 6/1929 | Johnson | 475/174 |
| 3,561,292 | A | * | 2/1971 | Lorence | 475/173 |
| 3,656,596 | A | * | 4/1972 | Morgan | 74/116 X |
| 4,262,556 | A | * | 4/1981 | Hart | 475/169 X |
| 4,732,054 | A |   | 3/1988 | Takamiya et al. | 74/750 B |
| 5,048,358 | A | * | 9/1991 | Shook | 74/112 |
| 5,123,884 | A | * | 6/1992 | Kondoh et al. | 475/178 X |
| 5,454,766 | A |   | 10/1995 | Mills | 475/170 |

FOREIGN PATENT DOCUMENTS

| FR | 660028 | * | 2/1929 | 475/178 |
| FR | 1011760 | * | 6/1952 | 74/112 |
| JP | 404282046 | * | 10/1992 | 475/178 |
| WO | WO 87/04681 |   | 8/1987 |  |
| WO | WO 95/06829 |   | 3/1995 |  |

* cited by examiner

*Primary Examiner*—Charles A. Marmor
*Assistant Examiner*—Roger Pang

(57) ABSTRACT

A double orbital transmission is disclosed which has first and second input shafts (12 and 13) which carry first and second eccentrics (14 and 16). The pawl carrier (24) is mounted on the second eccentric and the pawl carrier carries a plurality of pawls (32 and 34). An orbital body (50) is mounted on the first eccentric (16) and carries first and second assembler rings (42 and 44) for engaging with the pawls (32 and 34). The pawls (32 and 34) are restrained to undergo orbital motion by an orbit control plate (104) and the orbital body (50) is also constrained to undergo orbital motion and orbital control plate coupled to an output (120). A phase controller is provided to control the phase relationship between the two input shafts (12 and 13) and therefore the drive ratio of the transmission by controlling the phase relationship between the eccent rics (14 and 16). The combined orbital motion of the assembler rings (42 and 44) and the pawls (32 and 33 cause rotary power to be transmitted from the input shafts (12 and 13) to the output (120).

41 Claims, 13 Drawing Sheets

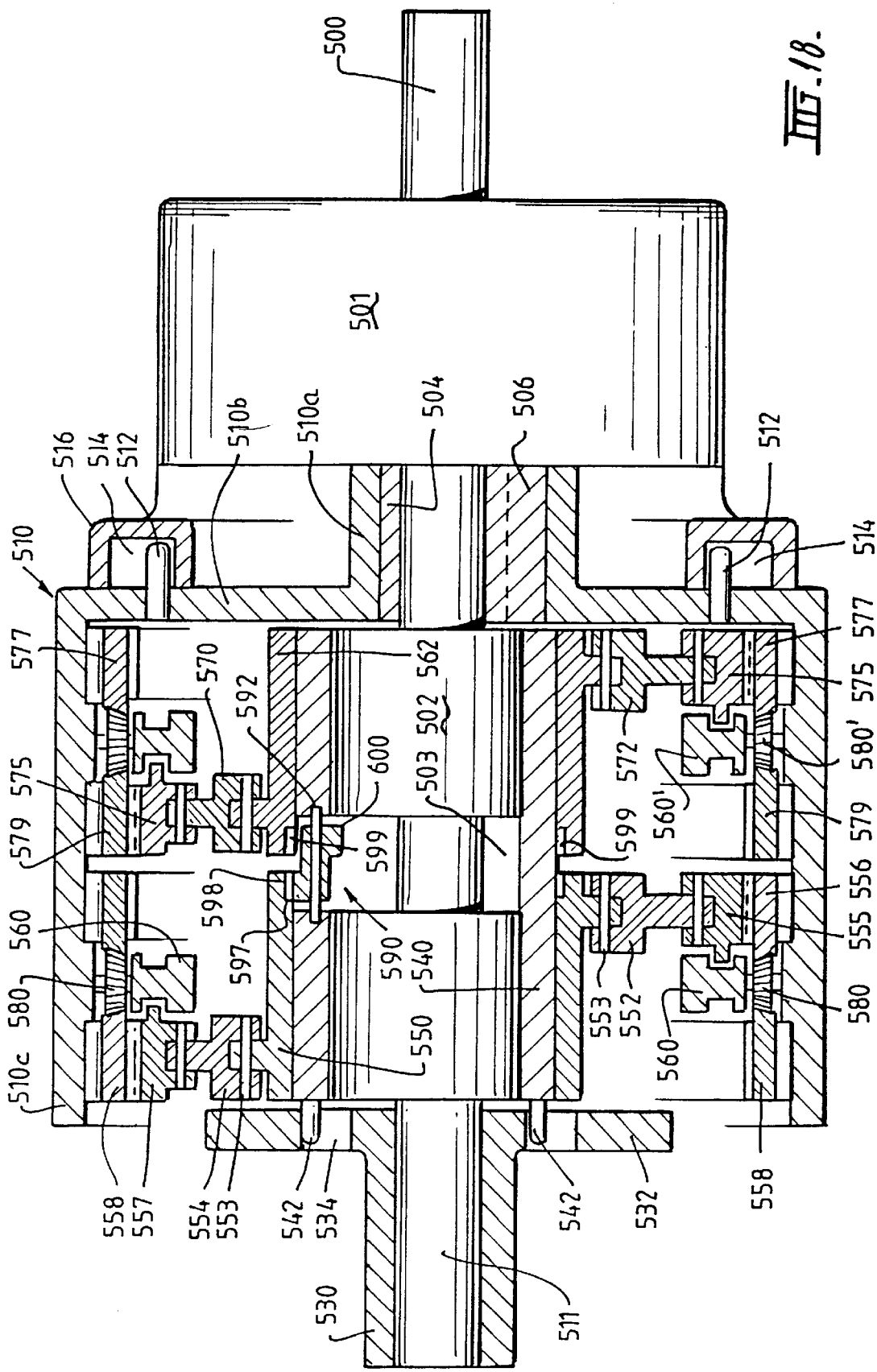

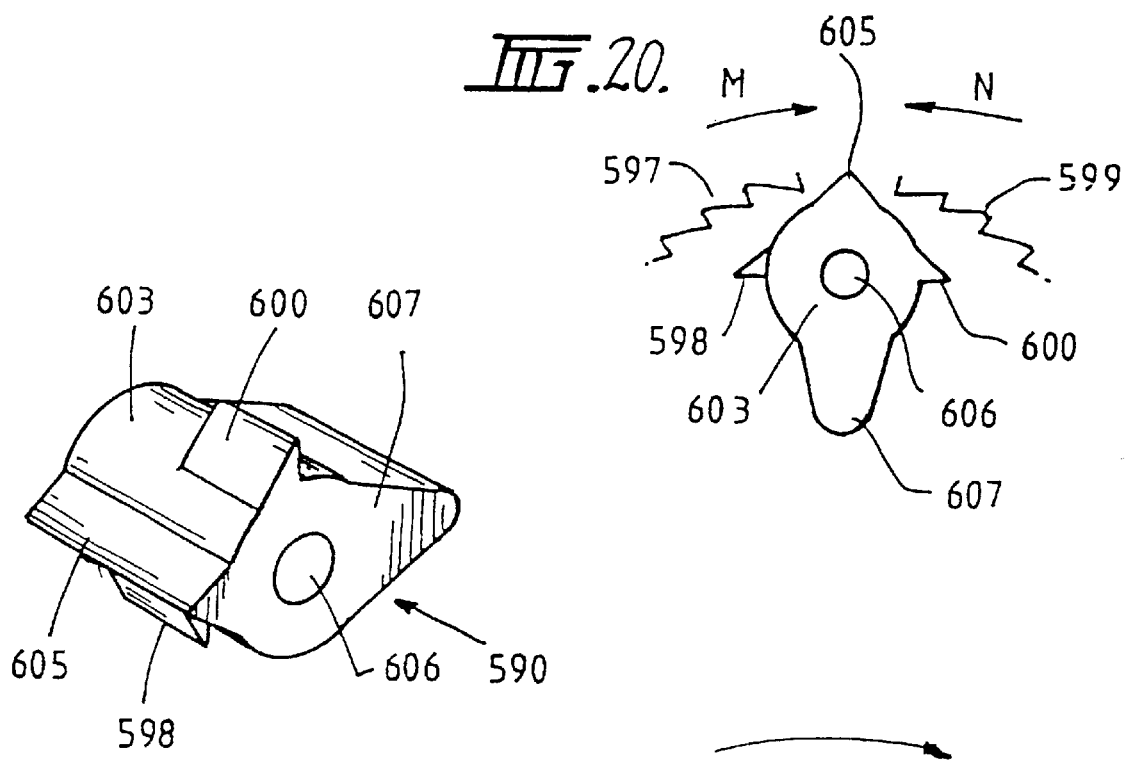

DOUBLE ORBITAL TRANSMISSION

This invention relates to a double orbital transmission and, in particular to an improvement or modification to the transmission disclosed in our earlier International Patent Application No. PCT/AU94/00445 (publication No. WO-95/06829). The contents of the earlier application are incorporated into this specification by this reference.

As is disclosed in the above international application, infinitely variable transmissions which operate on a friction principle are well known. One such transmission comprises a vee-belt and pulley system. The pulleys are each split into two frusto-conical portions which are movable axially towards or away from each other so as to vary the effective pulley diameter at which the belt contacts the puller. The major problem with this and other friction transmissions is that they are unable to transmit high torques, at least without making a transmission of excessive size as to be impractical.

A requirement accordingly exists for a variable ratio transmission which is able to transmit high torques in a practical manner. Transmission systems capable of coping with large torque loads in relatively small units, are inevitably based on rigid body elements such as gears formed in metals. This poses great problems for infinitely variable transmissions.

There is disclosed in my patent application No. PCT/AU81/00146 an infinitely variable mechanical transmission. Basically, this mechanism comprises means for transforming a circular input motion into non-circular periodic motion of a plurality of elements, or iterated operations of a single element, utilising only a part of the periodic motion of each element and transforming this part back into a rotary output motion. These parts of the periodic motion of the plurality of elements are connected or "assembled" sequentially to provide the output motion. This process is what is termed "motion transformation" and results in so-called "torque conversion".

In the transmission disclosed in International Patent Application No. PCT/AU81/00146, rotary motion of an input shaft is converted by an eccentric of variable eccentricity into a periodic motion of a plurality of racks. The periodic motion of each rack is converted into a rotary periodic motion of a pinion, and a selected part of the motion of the pinion is applied to a separate satellite gear of a planetary gear arrangement. The resultant output motion of a sun gear of the planetary gear arrangement is effected by the sequential action of each satellite gear. More specifically each rack operates in sequence to apply part of its motion to is associated satellite gear and thus to the output sun gear, a switching device being incorporated in the mechanism to switch on and off an operative connection between a pinion gear which is continually driven by the rack, and the associated satellite gear. While it may be theoretically possible to achieve either instantaneous switching or precise synchronism between the switching off of the operative connection between one rack and its associated satellite gear and the switching on of the operative connection between the next rack in the sequence and its associated satellite gear, it is not possible in practice to achieve this, and as a result the output will not be completely smooth; this may manifest itself as a slight jerkiness which can be felt it the output while under load. Whereas for some uses this lack of smoothness may be tolerated, for many uses it is necessary to obtain a flat or smooth and continuous output.

Thus, attempts to produce rigid body continuous variable transmissions have been based on the production of a plurality of partial intermediate circular or non-circular motions produced by a circular input and at some stage transformed back to a collated circular motion.

Pires U.S. Pat. No. 4,983,151 issued Jan. 8, 1991 discloses a mechanism which attempts to provide a smooth output by what Pires terms "averaging intermediate rotations". The device disclosed in Pires requires considerable precision and whilst the output is smoother than the transmission referred to in PCT/AU81/00146, the output still is no sufficiently smooth for many applications.

Our earlier International Patent Application No. PCT/AU94/00445 discloses the use of load distributing means for differentially distributing the load taken by secondary members of the transmission so that the load is distributed between at least two such members at any one time. Because of this distribution of load, the output power provided by the secondary members is smoother and continuous rather than jerky and discontinuous and therefore the transmission of input power to output power is smoother than in prior art rigid body continuously variable transmissions. The load distributing means which differentially distributes the load, collapses the kinetic form of the overlapping partial circular or non-circular motions and serially links their associated load functions by differentially distributing the load between at least two of the secondary members.

The specific embodiments disclosed in International Patent Application No. PCT/AU94/00445 are directed to bicycle transmissions, winches and other generally slow moving mechanisms although the invention is applicable to any type of transmission which requires or could use continuous variation in the drive output between a minimum drive ratio and a maximum drive ratio.

The present invention stems from further development of the invention disclosed in International Patent Application No. PCT/AU94/00445 and which, whilst could be used in any application requiring or desiring continuously variable transmission from a minimum ratio to a maximum ratio, is more concerned with higher speed and higher power applications such as heavy duty winch applications and automotive applications.

The invention may be said to reside in a transmission including:
- an input means;
- an output means;
- a plurality of secondary members for supplying output power for only part of each rotary cycle of the input means;
- power transfer means for engagement with the plurality of secondary members;
- the plurality of secondary members being coupled to one of the input means or the output means and the power transfer means being coupled to the other of the input means or the output means;
- first orbital means for causing the plurality of secondary members to undergo orbital motion; and
- second orbital means for causing the power transfer means to undergo orbital motion so the combined orbital motions cause power to be transmitted from the input power supply to the output power supply.

Preferably the transmission further includes load distributing means for differentially distributing the load taken by the secondary members between at least two of the secondary members at any one time.

Preferably the transmission includes phase changing means for changing the phase relationship of the orbital motions to, in turn, change the drive ratio of the transmissions.

Preferably the orbital motion is a stationary orbital motion but in other embodiments the orbital motion could be either a progressive or a regressive orbital motion.

Preferably the secondary members comprise a first set of pawls and a second set of pawls.

Preferably the first orbit means comprises a pawl carriage for carrying the first and second sets of pawls, the pawl carriage having an epicyclic plate, an orbital control plate adjacent the epicyclic plate and orbit control means between the orbital control plate and the epicyclic plate.

Preferably the orbit control means comprises a hole or recess on one of the orbital control plate or epicyclic plate and pins for engaging the hole or recess on the other of the orbital control plate or epicyclic plate.

In other embodiments, the orbit control means may comprise a gear recess on one of the epicyclic plate or orbit control plate and a gear member, for receipt in the gear recess, on the other of the epicyclic plate or orbit control plate; or a recessive or progressive orbital gear arrangement.

Preferably the power transfer means comprises a first assembler ring for engaging with the first set of pawls and a second assembler ring for engaging with the second set of pawls.

Preferably the first and second assembler rings have ratchet teeth on an inner peripheral surface and the pawls carry shoes which in turn have ratchet teeth for engaging with the ratchet teeth on the first and second assembler rings.

Preferably the pawl carriage has an axial portion and the pawls are pivotally coupled to the axial portion of the carriage ring.

Preferably the second orbit means comprises an orbit body for carrying the first and second assembly rings, the orbit body having an epicyclic plate, an orbital control plate adjacent the epicyclic plate and orbit control means between the orbital control plate and the epicyclic plate.

Preferably the orbit control means comprises a hole or recess on one of the orbital control plate or epicyclic plate and pins for engaging the hole or recess on the other of the orbital control plate or epicyclic plate.

In other embodiments, the orbit control means may comprise a gear recess on one of the epicyclic plate or orbit control plate and a gear member, for receipt in the gear recess, on the other of the epicyclic plate or orbit control plate; or a recessive or progressive orbital gear arrangement.

Preferably the input means comprises a first input shaft having an eccentric upon which the pawl carriage is mounted and a second input shaft having an eccentric upon which the orbit body is mounted.

Preferably the input means also includes phase control means for controlling the phase relationship between the first and second input shafts and therefore between the first and second eccentrics to in turn control the phase relationship between the first and second eccentrics and therefore the phase relationship between the orbital motions.

Preferably the differential load distribution means comprises differential load distribution gears arranged between the first and second assembler rings so that load can be transmitted from the first assembler ring to the second assembler ring and vice verse to thereby differentially distribute load between one of the first set of pawls and one of the second set of pawls at any one time.

Preferably the engagement shoes are guided in a guide ring arranged between the first and second assembler rings.

Preferably the engagement shoes have guide flanges which are received in grooves in the guide ring to thereby guide movement of the engagement shoes relative to the guide ring and the first and second assembler rings.

Preferably the differential load distribution gears are mounted on the guide ring and engage bevel teeth on side surfaces of the first and second assembler rings.

In this embodiment of the invention, the pawls are mounted on the pawl carriage which is in turn arranged on the first eccentric and the assembler rings are arranged radially outwardly with respect to the pawls.

In one embodiment of the invention, the teeth on the assembler rings which engage with the teeth on the engagement shoes are ratchet teeth.

In another embodimelt of the invention, positive engagement means is provided for moving the pawls into a position where the two orbits are able to positively cause engagement between the pawls and the assembler rings for any given phase relationship between the orbits. In this embodiment, the teeth on the assembler rings which are to engage the pawls are of sinusoidal shape. In this embodiment of the invention, the pawls may be provided with teeth at their ends rather than engagement shoes and preferably the teeth are also of sinusoidal shape. However, the pawls could be provided with engagement shoes having teeth of sinusoidal shape.

In this embodiment of the invention, the assembler rings are mounted on the first eccentric and the pawls are arranged radially outwardly of the assembler rings for engagement with the assembler rings.

Preferably the positive engagement means comprises arm members on the pawls and a control body for axial movement relative to the pawls, the control body having wedge-shaped recesses for receiving the arms so that upon axial movement of the control body, the wedge-shaped recesses contact the arms to move the pawl bodies radially to thereby cause positive engagement of the pawls with the assembler rings.

In this embodiment, the pawls are supported by the orbit body and the orbit body is provided with openings for receiving the pawls.

Preferably control means is provided for axially moving the control body to engage and disengage the pawls with respect to the assembler rings.

In a further embodiment of the invention, the first orbital means includes a first eccentric and orbit control means for controlling the orbital motion and the second orbital means comprises a plurality of axles from which is mounted the power transfer means, the axles having eccentrics and being rotatable to provide controlled orbital motion to cause the power transfer means to undergo orbital motion.

Preferably the power transfer means are supported by an orbital body mounted on the axles.

The present invention also provides a transmission mechanism including:

an input power supply for supplying input rotary power;

an output power supply for providing rotary output power;

a plurality of secondary members arranged between the input power supply means and the output power supply means for transmitting power from the input power supply means to the output power supply means, the plurality of secondary members comprising at least a first array, including at least one secondary member, between the input power supply and the output power supply, and a second array including at least one further secondary member between the input power supply and the output power supply, the first and second arrays being in parallel with respect to one another;

a first assembler ring for engagement with the first array of secondary members;

a second assembler ring for engagement with the second array of further secondary members;

the secondary members of the first array and the secondary members of the second array being in engagement with the respective first and second assembler rings through only part of each rotary cycle of the transmission mechanism; and a load a distributing gear engaged between the first and second assembler rings for differentially distributing the load taken by the secondary members between the said at least one secondary member of the first array and the at least one further secondary member of the secondary array.

Preferably the first and second assembler rings have gear teeth on radially extending side surface thereof for engagement with the load distribution gear.

In one embodiment of the invention, the secondary members are arranged radially inwardly of the first and second assembler rings and ratchet gear teeth are provided on an inner peripheral circumference of the first and second assembler rings for engagement with the respective first array of secondary members and second array of secondary members.

In another embodiment, the first and second assembler rings are arranged radially inwardly of the secondary members and ratchet gear teeth are provided on an outer circumferential surface of the first and second assembler rings for engagement respectively with the first array of secondary members and second array of secondary members.

In another embodiment of the invention, the transmission is adapted to provide output rotation in a clockwise or anticlockwise direction so that drive in a first direction can be provided or drive in an opposite direction can be provided.

In this embodiment of the invention, the transmission mechanism include a second plurality of secondary members for supplying output power for only part of each rotary cycle of the input means;

a second transfer means for engagement with the plurality of secondary members;

the second plurality of secondary members being coupled with the plurality of secondary members for movement with the plurality of secondary members and the second transfer means being integral with or coupled to the power transfer means; and the plurality of secondary members and power transfer means engaging and providing drive during rotation in a first direction of the input means and the second plurality of secondary members and second power transfer means engaging and providing drive during rotation in an opposite direction of the input means.

Preferably the transmission includes first plurality of secondary means are constrained so as to only engage the transfer means in the region when the transfer means and secondary members are closest during orbital movement of the secondary members and transfer means.

Preferably the double orbiting system produced by the first orbital means and second orbital means provides two drive phases, one on the closest approach side of the orbiting power transfer means to the orbiting plurality of secondary a members to produce a primary orbit and one on the opposite side to produce a counter phase orbit.

Preferably the transmission includes means for switching off one of the phases of the transmission to enable drive to be transmitted either direction so that as the second plurality of secondary members begins to transmit drive, there is no destructive interference from the plurality of secondary members as one engages the primary phase and the other engages the counter phase.

The invention may also be said to reside in a transmission including:

an input means;

an output means;

a first plurality of secondary members for supplying output power for only part of each rotary cycle of the input means a first direction;

a second plurality of secondary members for supplying output poser for only part of each rotary cycle of the input means in a reverse direction opposite the first direction;

power transfer means for engagement with the first plurality of secondary members and the second plurality of secondary members;

first orbit control means for causing the first and second plurality of secondary members to undergo orbital motion;

second orbital control means for causing the power transfer means to undergo orbital motion so the combined orbital motion causes power to be transmitted from the input power supply to the output power supply; and means for selectively allowing supply of power between the first plurality of secondary members and the power transfer means in the first direction and supply of power between the second plurality of secondary members and the power transfer means in the reverse opposite direction so the transmission can selectively supply power in the first direction or the opposite reverse direction.

Preferably the direction control means comprises a switch having an activation point and a first engagement tooth and a second engagement tooth, the switch being pivotally mounted to the first orbital means;

the first and second plurality of secondary members including first and second respective carriers, the first and second respective carriers having teeth for engagement selectively with the first or second tooth of the switch; and upon rotation of the input means in the first direction, the teeth of the carriage carrying the first plurality of secondary members engage the activation point of the switch to pivot the switch to cause the first tooth to engage with the teeth of the carriage so as to lock the first carriage to the first orbit control means; and upon rotation of the input means in the reverse opposite direction the teeth of the second carriage engage the activation point to pivot the switch to cause the second tooth to engage with the teeth of the second carriage to lock the second carriage to the first orbital means.

Preferably the first orbital means comprises a orbit control cylinder coupled with the output means.

Preferably the orbit control cylinder is mounted on a first eccentric which in turn is mounted on the input shaft.

Preferably the plurality of first secondary members comprises two sets of pawls.

Preferably the second plurality of secondary members comprises two set of pawls.

Preferably the power transfer means comprises first and second pairs of assembler rings, each pair of assembler rings having a differential load distribution gear arranged therebetween for differentially distributing load between a pawl in the first set of pawls and the second set of pawls of each of the first plurality of secondary members and second plurality of secondary members.

Preferably the second orbit means comprises an orbit body carrying the first and second assembler rings.

Preferably the differential load distribution gears are coupled to the orbit body.

Preferred embodiments of the invention will be disclosed, by way of example, with reference to the accompanying drawings, in which:

FIG. 18 is a cross-sectional view through the embodiment of FIG. 17;

FIG. 19 is a view of a component used in the embodiment of FIGS. 17 and 18; and

FIGS. 20, 21 and 22 show various operational positions of the component of FIG. 19.

Figure 1:
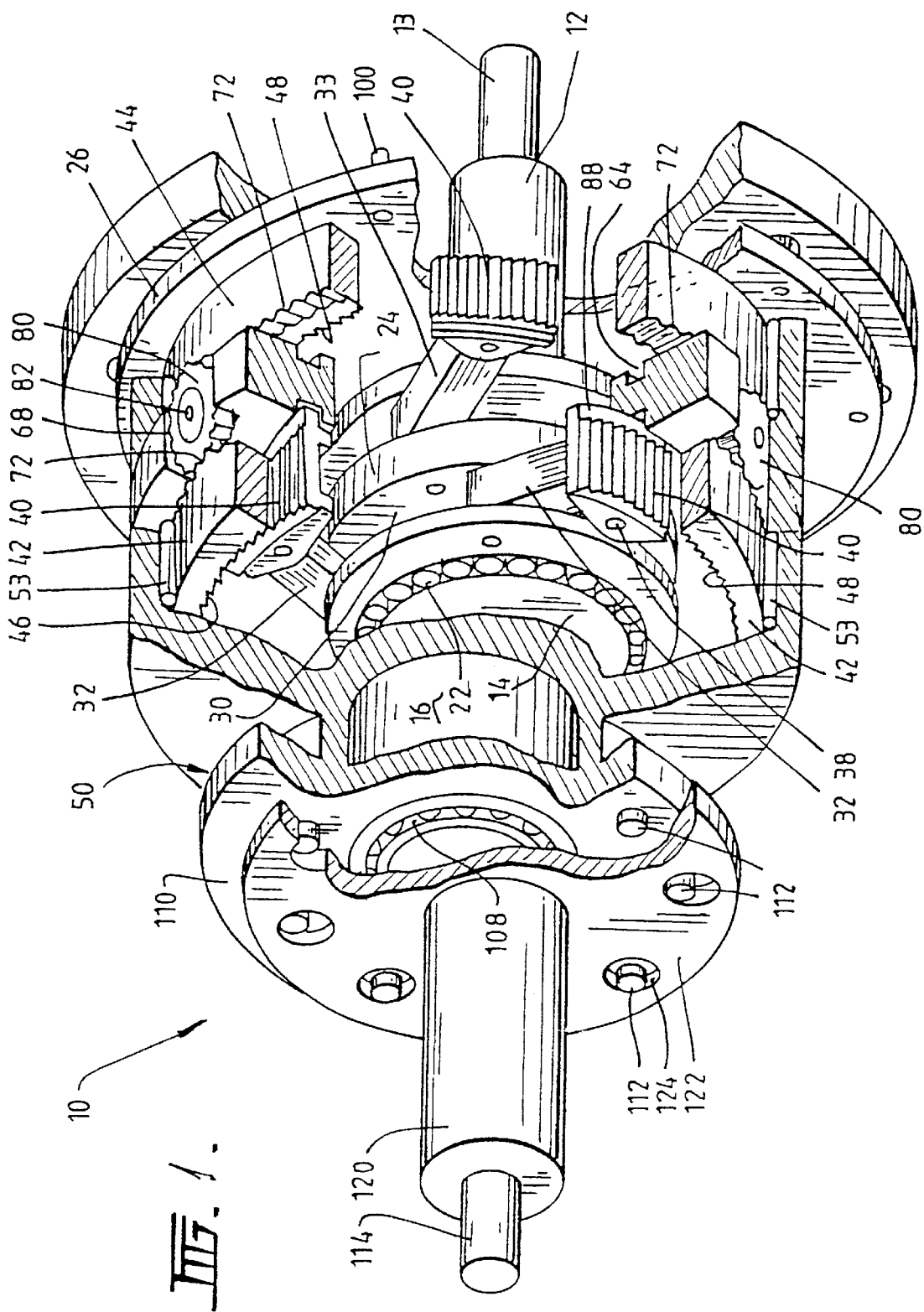
FIG. 1 is a partially broken-away view of a transmission embodying the present invention.
Figure 2:
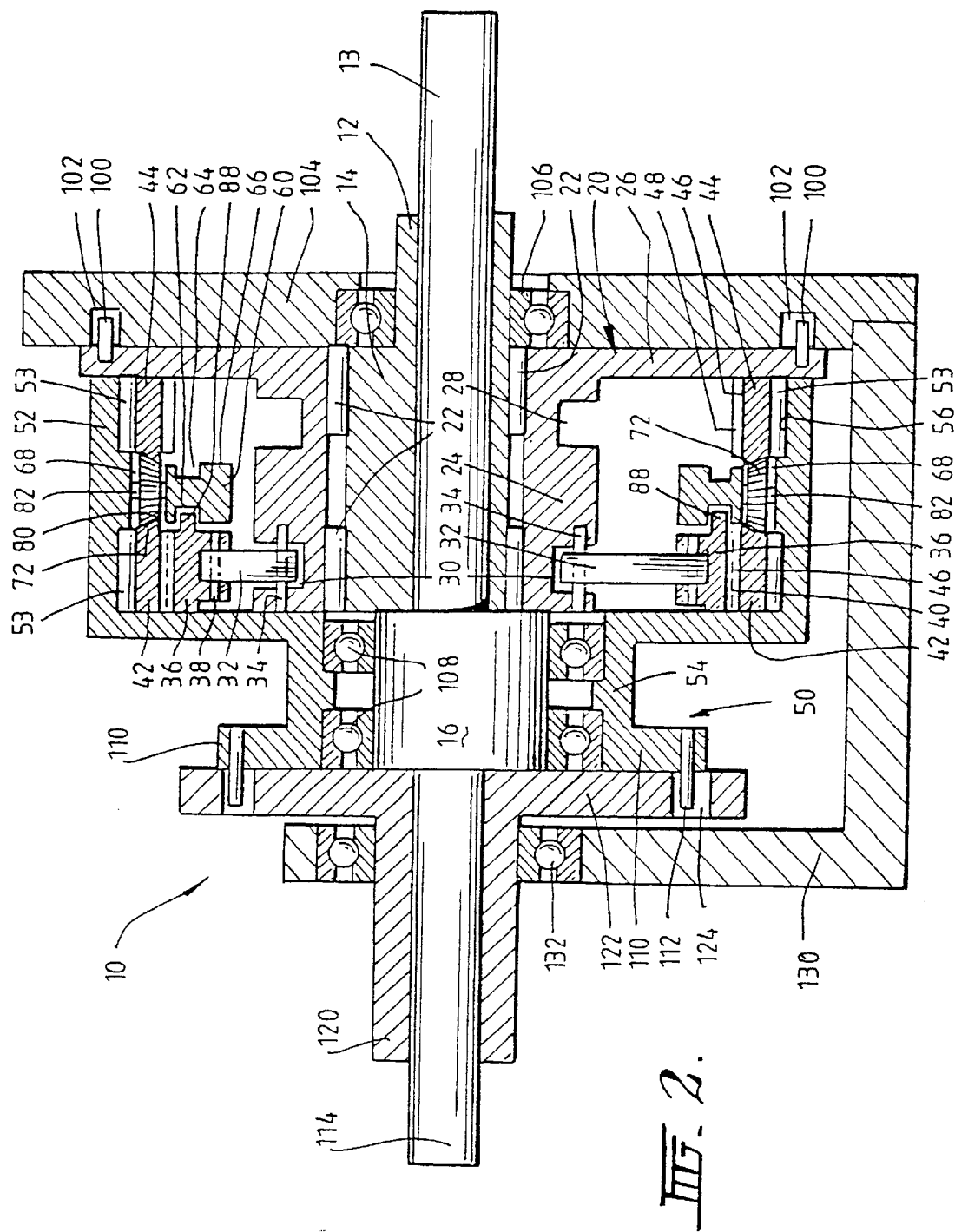
FIG. 2 is a cross-sectional view of the transmission of FIG. 1.

With reference to FIGS. 1 and 2, a transmission 10 is shown which has a first input shaft 12 which carries a first eccentric 14. The input shaft 12 is hollow and arranged within it is a second input shaft 13 which carries a second eccentric 16. A pawl carriage 20 is arranged on the eccentric 14 via bearings 22. The pawl carriage 20 has an axially extending portion 24 and a radially extending portion 26. The axially extending portion 24 has two circumferential grooves 28 and 30 in which two sets of pawls 32 and 31 are respectively pivotally mounted via pivot pins 34. It should be noted in the cross-sectional position shown in FIG. 2 the pawls 33 associated with the grooves 28 cannot be seen because they are out of alignment with the paws 32 arranged within the groove 30 as is most clearly shown in FIG. 1. The number of pawls in each set of pawls 32 an 33 which can be pivotally mounted in each of the grooves 28 and 30 is arbitrary but preferably comprises from four to eight pawls in each groove 28 and 30.

The pawls 32 and 33 are provided with engagement shoes 36 and 37 respectively. The engagement shoes 36 and 37 are pivotally mounted to the pawls 32 and 33 by pivot pins 38. The engagement hoes are provided with ratchet teeth 40 as is best seen in FIG. 1.

First and second assembler rings 42 and 44 are provided about the axial section 24 of the pawl carriage 20 and are radially aligned with the respective pawls 32 and 33.

The inner circumference of the assembler rings 42 and 44 are provided with ratchet teeth 48 for engagement with the ratchet teeth 40 on the engagement shoes 36 and 37 as will be disclosed in more detail hereinafter.

An outer orbit body 50 has a first enlarged diameter section 52 and a second smaller diameter section 54. The enlarged diameter section 52 surrounds and supports the assembler rings 42 and 44. Roller bearings 53 are provided between the assembler rings 42 and 44 and the portion 52 of the orbit body 50. The roller bearings 53 may be located in grooves 56 provided in the internal surface of the portion 52 and act to support and guide relative rotation of the assembler rings 44 and 46 relative to the orbit body 50.

A guide ring 60 is arranged between the assembler rings 42 and 44 and is fixed to the orbit body 50. The guide ring 60 can be fixed to the orbit body 50 by bolts or other suitable fasteners or alternatively could be made integral with the orbit body 50 and project radially inwardly from the orbit body 50 between the assembler rings 42 and 44. The guide ring 60 has circumferential grooves 62 and 64 on side surfaces 66 and a plurality of cutouts 68 on outer surface 70.

The assembler rings 44 and 46 have gear teeth 72 on inwardly facing surfaces 74 of the assembler rings 44 and 46. Arranged within each of the cutouts 68 is a gear 80 which is mounted on an axle 82 secured in a respective cutout 68 and to the ring 60. The gear 80 meshes with the teeth 72 on the side surfaces of the assembler rings 44 and 46 as can be best seen in FIG. 1. Once again, the number of cutouts 68 and gears 80 is somewhat arbitrary but typically between four and six such gears may be provided.

Engagement shoes 36 and 37 are provided with projecting flanges 88 and 89 which engage within the grooves 62 and 64 of the ring 60 to thereby guide movement of the shoes 36 and 37 about a predetermined path relative to both the rings 60 and the assembler rings 42 and 44.

The radial portion 26 of the pawl carriage 20 forms a first epicyclic plate and carries a plurality of pins 100 which are received in circular holes or recesses 102 in a first orbit control plate 104. The plate 104 is mounted on first input shaft 12 by bearings 106. The pins 100 and recesses 102 form a first orbit control as will be described in more detail hereinafter.

The reduced diameter portion 54 of the orbit body 50 is mounted on the second eccentric 16 via bearings 108. The second portion 54 has a stepped portion 110 which forms a second epicyclic plate and which carries pins 112. The second eccentric 16 has an extension shaft 114 on which an output shaft 120 is mounted. The output shaft 120 has a radially extending flange 122 which is provided with a plurality of holes or circular recesses 124. The pins 110 are received within the holes 124 and the pins 110 and holes 124 form a second orbit control as will be explained in more detail hereinafter.

FIG. 2 shows a stand or outer casing 130 which is mounted on output shaft 112 via bearings 132. The casing 130 is not shown in FIG. 1 for ease of illustration and clarity purposes.

In order for the transmission 10 to provide power from the input to the output rotary input power from a power source (not shown) is provided to the two input shafts 12 and 13. The rotary input power is supplied via a phase controller as described in our International Patent Application No. PCT/AU96/00763 (WO 97/30813), the contents of which are incorporated by this reference. The purpose of the phase controller is to also provide a desired phase relationship between the input shafts 12 and 14 and therefore between the eccentrics 14 and 16 to control the drive ratio of the transmission as will be described hereinafter.

Thus, input rotary power is supplied to the input shafts 12 and 13 from a power source such as internal combustion engine, electric motor or any other drive source so that the shafts 12 and 13 are rotated. Rotation of the shaft 12 will cause the eccentric 14 to rotate to in turn move the pawl carriage 20. Since the pawl carriage 20 is coupled to orbit control plate 104 (which may simply be part of the outer casing 130 or the like) the carriage 20 is restrained to undergo all stationary orbital motion because of the engagement of pins 100 within the recesses 102 of stationary control plate 104. Similarly, rotation of the input shaft 13 rotates the eccentric 16 so that the orbit body 50 also undergoes stationary orbital motion due to the interconnection of the orbit body 54 to the flange portion 122 which forms a control plate by virtue of the engagement of the pins 110 in recesses 124. Thus, a double orbit stationary orbital motion is created. If the orbital motions are out of phase, as will be explained in more detail with reference to FIGS. 3 and 4, the pawls 32 and 33 will come into engagement with the assembly rings 42 and 44 (via the engagement shoes 36 and 37). Each pawl 32 and 33 in the sets of pawls will therefore engage with the respective rings 42 and 44 in turn for part of the rotary cycle of the transmission so as to transmit drive so that the rings 42 and 44 will also tend to orbit and transmit drive through to the guide ring 60 via the differential load distribution gears 80. Thus, the guide ring 60 and therefore the orbital body 50 will rotate as well as undergo stationary orbital motion. Thus, the motion of the orbital body is a complex motion involving both a stationary orbital motion as well as a rotary motion. The orbital control formed by the pins 110 and the recesses 124 acts as a transformer to separate the complex orbital and rotational motions so that the orbital motion remains with the orbital body 50 and the rotary motion is transferred to the output shaft 120 so that the output shaft is rotated to thereby provide output rotary power.

Figure 3:
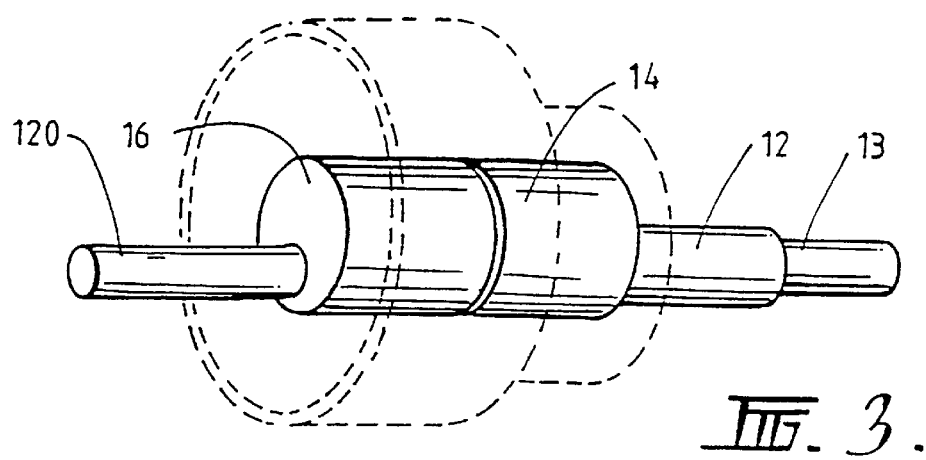
FIG. 3 and FIG. 4 are diagrams illustrating the principle of the invention in schematic form.
Figure 4:
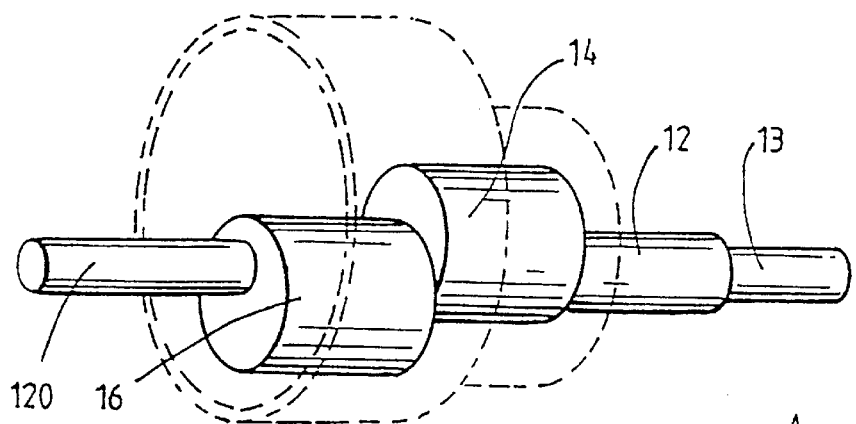

As is best shown with reference to FIGS. 3 and 4, if the input shafts 12 and 13 are adjusted by the phase control mechanism of the type disclosed in the above mentioned Australian Patent Applications so that the eccentrics 14 and 16 are in phase as is shown in FIG. 3, if there is no difference between the aphelion and parhelion of the two orbits ie the aphelion equals the parhelion. If the shafts 12 and 13 are adjusted by the phase control mechanism to bring about a phase difference between the eccentrics 14 and 16 as is shown in FIG. 4, the aphelion and parhelion of each individual orbit remains the same but the relationship between the two changes throughout the cycle of rotation supplied to the input shafts 12 and 13 and it is this change which causes the operation of the pawls during the orbiting motion which creates the rotation of the assembler rings 42 and 44 and also the rotation of the orbit body 50 as well as the orbital motion of the orbit body 50 to thereby provide the output power supply. The ratio of the output compared to the input is adjusted by the amount of phase difference between the eccentrics 14 and 16 which, again, is controlled by the phase control mechanism mentioned above. FIG. 4 shows the maximum phase difference of 180°. If the phases of the eccentrics 14 and 16 is adjusted so that there is no phase difference as shown in FIG. 3, then no output power is produced.

The different phase relationship of the two orbits produces different rates of acceleration of the approach of the inner surface of the orbit body 50 and the outer surface of the pawl carriage 20 and this allows the production of different ratios of drive.

Preferably the orbital motion of the carriage 20 and orbit body 50 is a stationary orbit. However, either a progressive or redressive orbit could also be embodied in the invention. If a progressive gear is used to create a progressive orbit, instead of an epicyclic plate (of the type shown in the drawings) or a stationary gear, then either the ratio can be increased or reverse function can be made to operate when the two orbits are in phase.

The gears 80 form differential load distribution gears which ensure that load is distributed between at least two of the pawls 32 ad 33 at any one time. The differential load distribution occurs because when one of the pawls 32 comes into engagement with the ring 40, via the engagement shoe 36, the assembler ring 42 will accelerate from the beginning of the drive up to a maximum level and then begin to slow. At this point, the acceleration of the next pawl 32 which begins to come into engagement with the ring 42 becomes greater and it overtakes the first pawl 32 causing the pawl 32 to become disengaged from the motion of the system.

Similarly, when pawls 33 come into engagement with assembler ring 44 via the shoes 37, exactly the same type of acceleration occurs. The speeding up and slowing down of the rings 44 causes the differential load distribution gears 80 to rotate back and forth in a rocking type motion as the assembler rings 42 and 44 speed up and slow down relative to each other. This rocking motion will transfer the load from one of the pawls 32 to at least one of the pawls 33 to thereby provide a smooth output at the output shaft 120. The load distribution gears 80 act to provide as much differential load transfer as is required to provided a completely smooth output. The differential load distribution gears 80 thereby provide an equal distribution of the load between the pawls 32 and 33 and therefore zero fluctuation at the output shaft 120. Thus, a continuous and smooth output is achieved.

In order to change the drive ratio of the transmission, the phase relationship between the eccentrics 14 and 16 is altered by the phase adjustment mechanism according to the earlier patent applications mentioned above. Thus, the phase relationship can be changed between zero phase difference to a 180° phase difference to thereby change the drive ratio of the transmission in a continuously variable fashion. Thus, continuously variable transmission from a minimum drive ratio to a maximum drive ratio can be obtained by the transmission (for example, from a very low ratio up to a ratio approaching 1:1).

Figure 5:
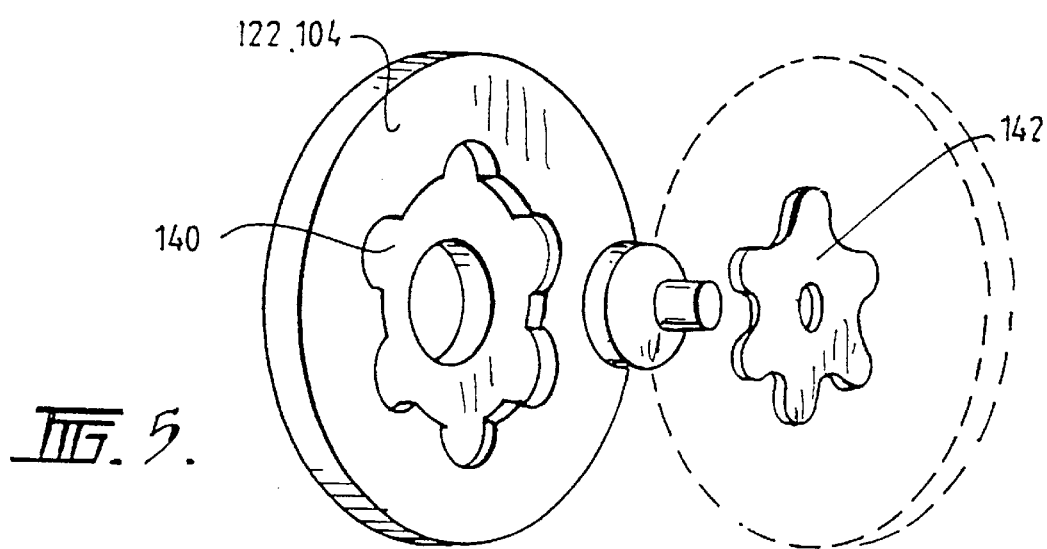
FIG. 5 is a view of an alternative arrangement which can be uses in the embodiment of FIGS. 1 to 4.

In a further embodiment of the invention, rather than provide orbit control via the pins 100 and 110, and recesses 102 and 124, recessed gears of the type shown in FIG. 5 could be utilised.

In this embodiment the holes 124 in radial portion 122 and the holes 102 in plate 104 would be replaced by a cutout 140 and the pins 100 and 110 would be replaced by a gear 142 which locates within the cutout 140 and engages in the recess 140 to control the orbital motion in exactly the same way as the pins 100 and 112 engage in the openings 102 and 124 to control the orbital motion.

The pins 100 would basically ride in approximately one half of the inner periphery of the holes or recesses 102 during the orbital motion of the carriage 20 to thereby guide the orbital movement.

Figure 6:
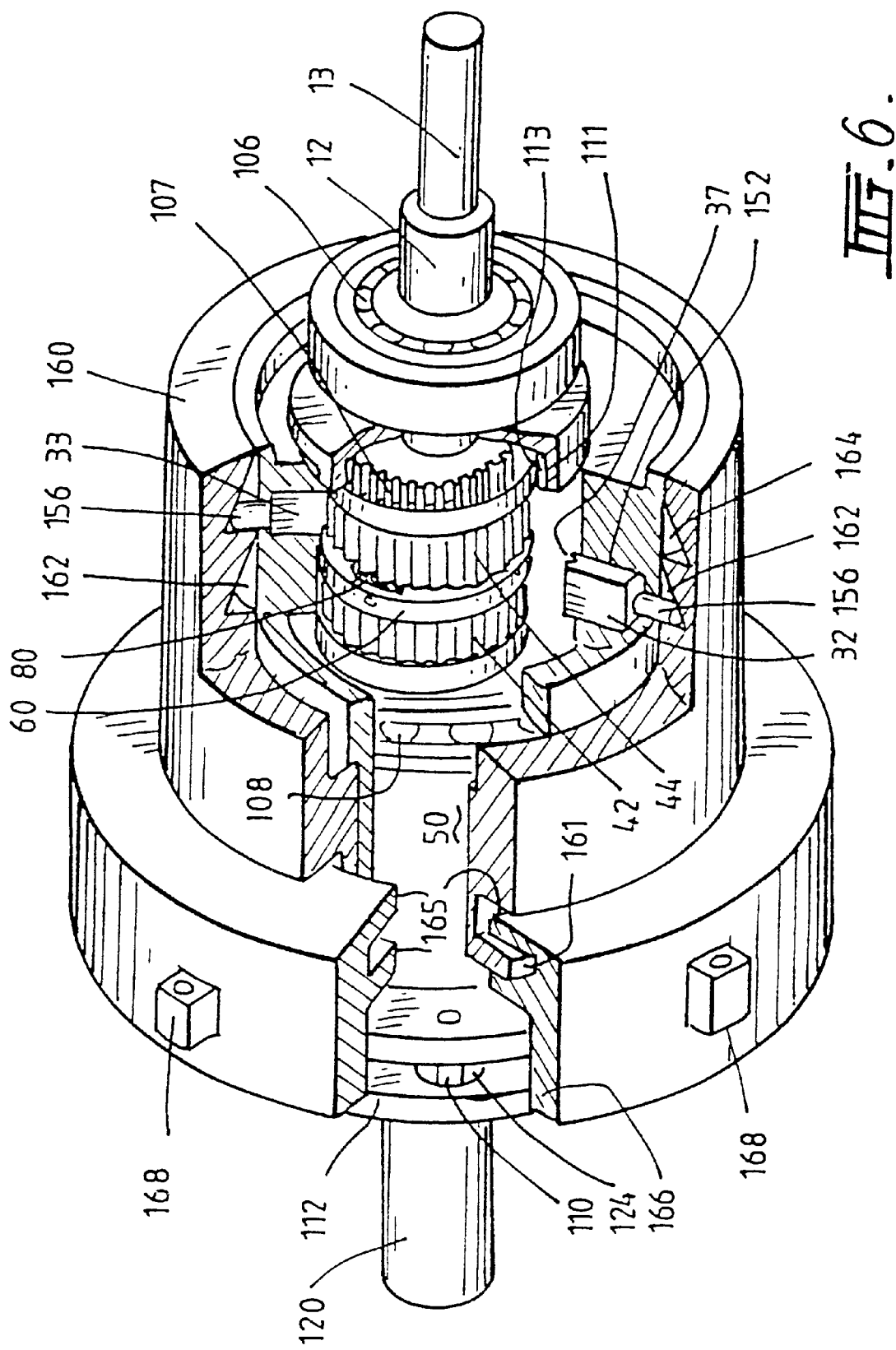
FIG. 6 is a partially cut away view of a second embodiment of the invention.
Figure 7:
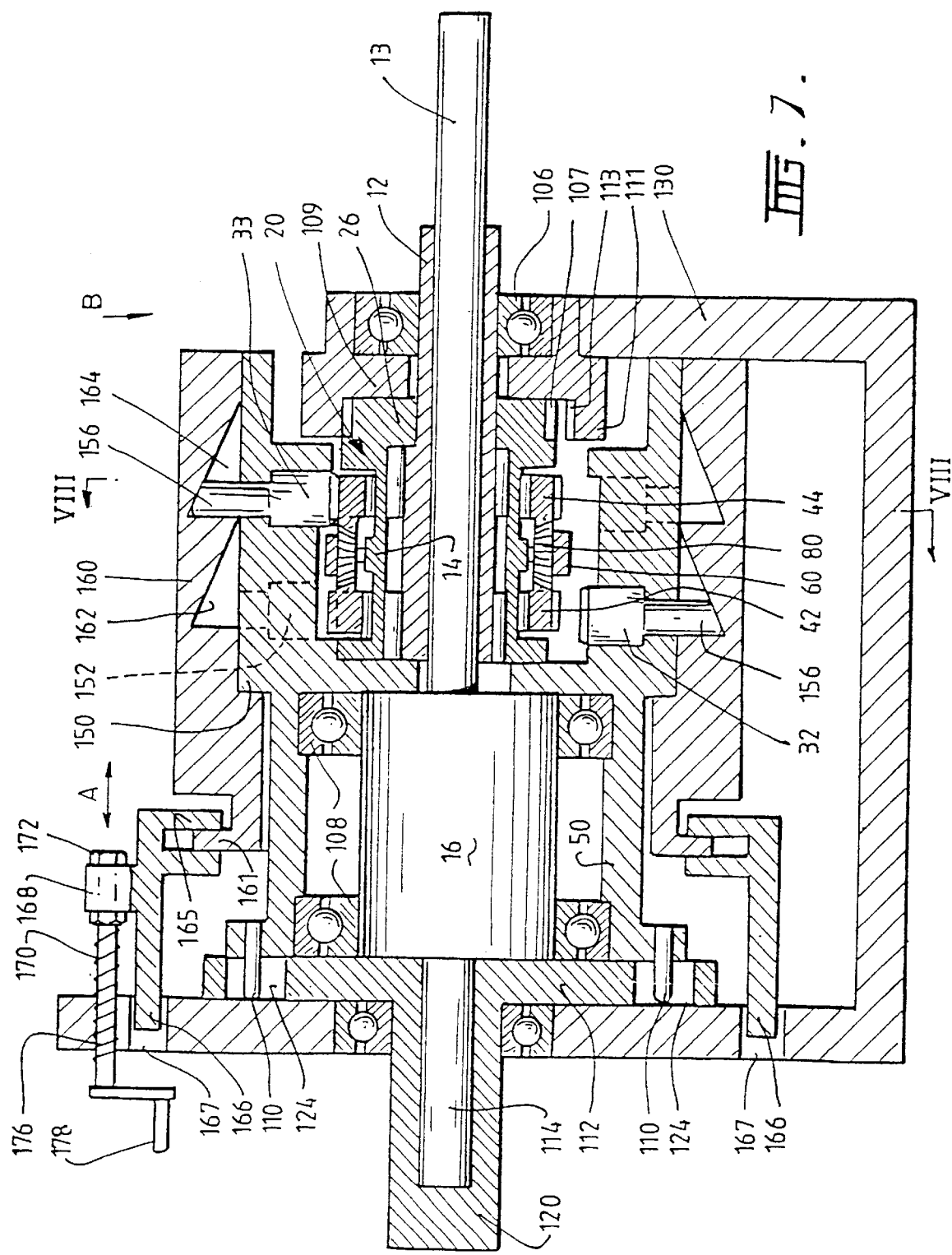
FIG. 7 is a cross-sectional view of the embodiment of FIG. 6.
Figure 8:
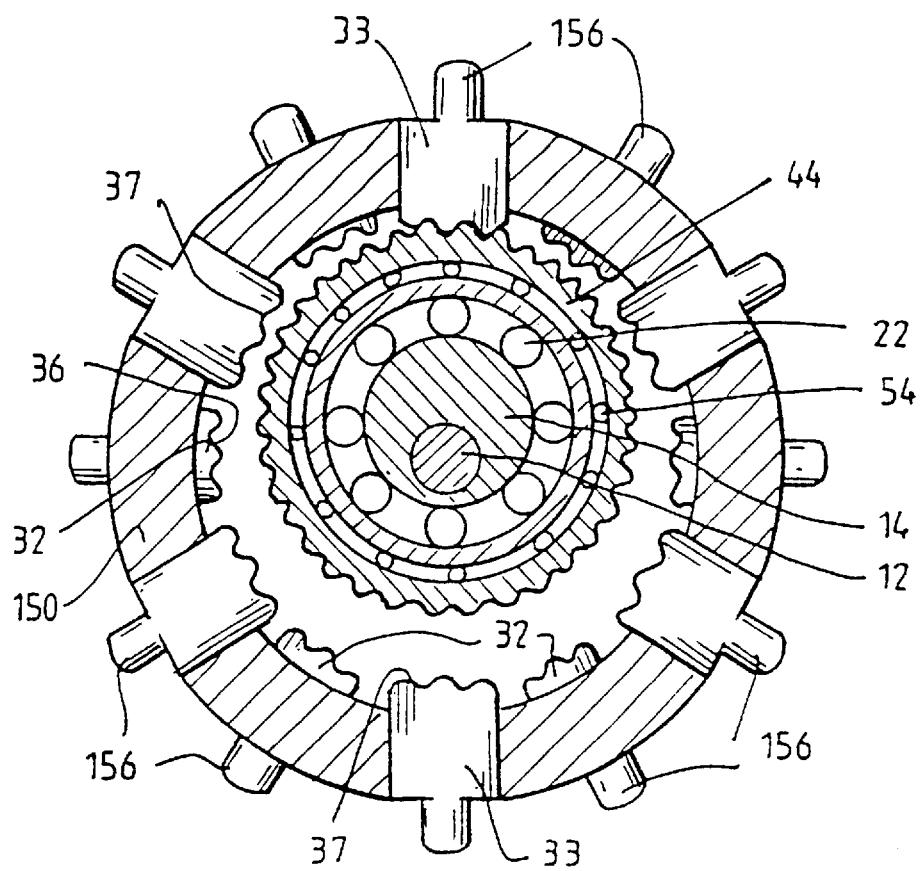
FIG. 8 is a view along the line V—V of FIG. 7.

With reference to FIGS. 6 to 8, a second embodiment of the invention is disclosed. In this embodiment the assembler rings and pawls are reversed so that the assembler rings are radially inwardly of the pawls and the pawls are radially outwardly of the assembler rings rather than the opposite arrangement which was described with reference to FIGS. 1 to 5. Furthermore, this embodiment provides for positive engagement of the pawls with the assembler rings as will be described in more detail hereinafter. Like reference numerals in this embodiment relate to the same parts as described with reference to the previous embodiments.

In the embodiments of FIGS. 6 and 7, the pawl carriage 20 now effectively forms a carriage for the assembler rings 42 and 44 so that the assembler rings 42 and 44 are mounted on the carriage 20 which is arranged on the eccentric 14 in the same manner as previously described. The carriage 20 has a radially inwardly protecting flange 26. In this embodiment, rather than use an epicyclic plate to control the orbit, a recessive gear arrangement is utilised. In this regard, the outer circumference of the flange 26 is provided with gear teeth 107. A gear ring 109 is arranged on the bearings 106 and the gear ring 109 has an axially extending flange 111. The inner circumference of the flange 111 carries gear teeth 113 which are intended to engage with the gear teeth 107 to control orbital motion in the form of a regressive orbital gear arrangement.

In this embodiment, the differential load distribution gears 80 are carried by a ring 60 arranged between the assembler rings 42 and 44 as in the earlier embodiments and engage with teeth on the rings 42 and 44 exactly as described in the earlier embodiment.

The orbital body 50 in this embodiment has a pawl retaining section 150 which has bores or slots 152 for receiving the pawls 32 and 33. The pawls 32 and 33 have arms 156 extending radially outward thereof.

Arranged about the orbital body 50 is a cylindrical adjustment control 160. The adjustment control 160 has wedge shaped grooves 162 and 164 which receive the arms 156 of the pawls 32 and 33. The pawls 32 and 33 do not have engagement shoes as in the earlier embodiment, but rather the teeth 40 are provided directly on the ends of the pawls 32 and 33. However, in this embodiment of the invention, rather than the teeth being ratchet type teeth, the teeth are preferably sinusoidal in shape. Similarly, in this embodiment, the teeth on the assembler rings 42 and 44 which engage with the teeth 40 are arranged on the outer peripheral surface of the rings 42 and 44 and are also sinusoidal in shape to match the teeth on the engagement shoes in such a way as to minimise radial forces.

The adjustment control 160 has a flange 162 at one end which is engaged by a bifurcated control head 164 which is provided on a control cylinder 166. The control cylinder 166 projects through an annular space 167 in the stand or casing 130. Screw-threaded shafts 170 are engaged with screw-threaded holes 172 in blocks 168 which are provided about the circumference of the adjustment control cylinder 166. The screw-threaded shafts 170 is axially retained in a bore 176 in the casing 130. A crank handle 178 or a gear may be provided on the rods 170 for facilitating adjustment of the rods 170 at will be described hereinafter.

In order to effect positive engagement of the pawls 32 and 33 with the assembler rings 42 and 44, the handle 178 can be cranked so as to cause the adjustment cylinder 166 to move in one of the directions shown by double headed arrow A by virtue of engagement of the screw-threads on shaft 170 with the screw-threaded bores 172 in blocks 168. Movement of the adjustment cylinder 176 also moves the adjustment control ring 160 in one of the directions of double headed arrow A by virtue of engagement of the bifurcated head 164 with the flange 152. Movement of the control ring 160 will therefore cause the wedge-shaped recesses 162 to move relative to the arms 156 which, assuming that the adjustment control ring is moved to the left in FIG. 7 will cause the arm 156 to be forced inwardly in the direction of arrow B so that the pawls 32 and 33 are moved in the same direction to push the pawls 32 and 33 into a position for a given ratio (or phase relationship) where positive engagement with the sinusoidal teeth on the rings 42 and 44 as the shoes and rings 42 and 44 are brought into engagement by the rotational and orbital movement of the carriage 20 and therefore the rings 42 and 44 and also the orbital movement of the orbiting body 50 which carries the pawls 32 and 33. Thus, the two out of phase orbital motions therefore cause power to be transmitted from the input shafts 12 and 13 from the assembler rings 42 and 44 to the pawls 32 and 33 and hence to the orbiting body 50 to cause rotation as well as orbital motion of the orbiting body 50 which in turn is supplied to the output shaft 120 via the flange 12 which forms an epicyclic plate for orbital control of the orbiting body 50.

Figure 9:
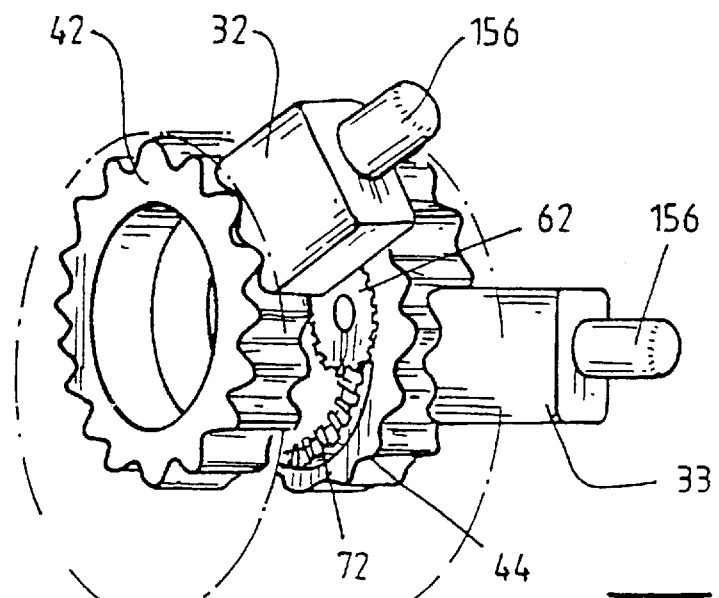
FIG. 9 is an illustrative diagram used to explain operation of the embodiment of FIGS. 6 to 8.
Figure 10A:
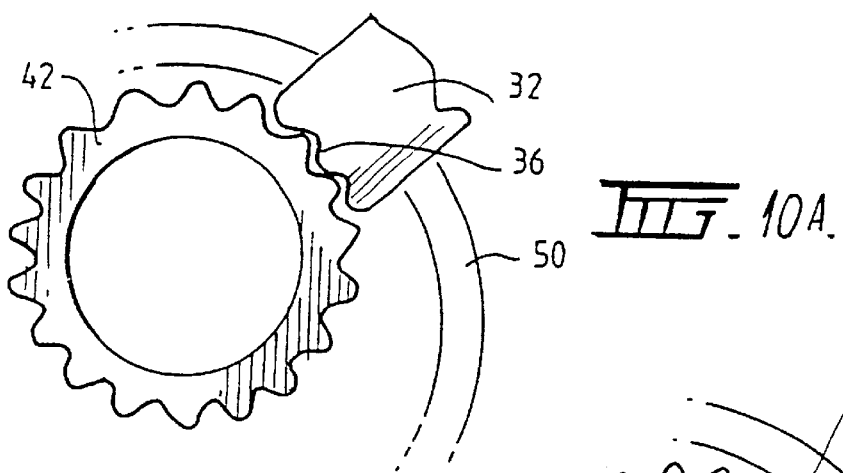
FIGS. 10A and 10B are operational diagrams relating to the operation of the embodiment of FIGS. 6 to 8.
Figure 10B:
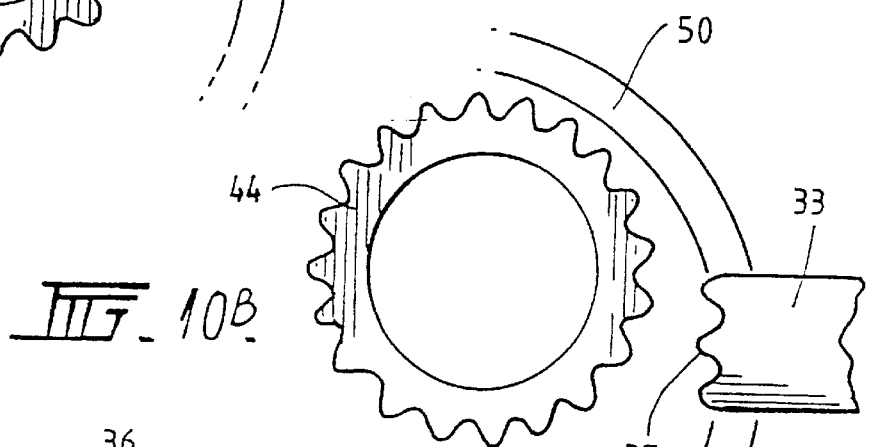
Figure 11A:
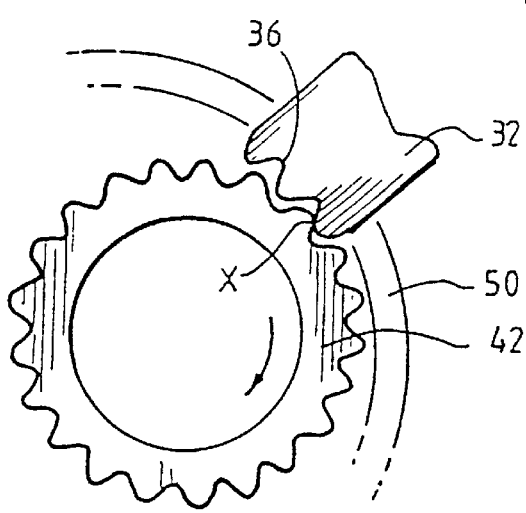
FIGS. 11A and 11B are operational diagrams similar to FIGS. 10A and 10B.
Figure 11B:
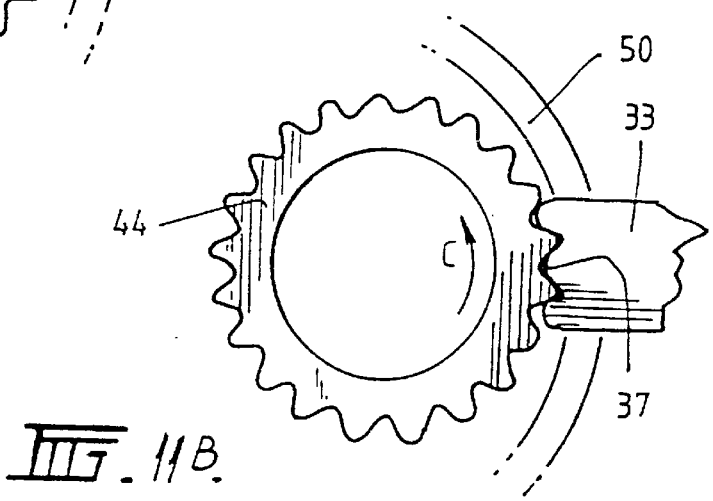

FIGS. 9, 10A, 10B, 11A and 11B are illustrative diagrams showing operation of the embodiments of FIGS. 5 to 8. FIG. 9 is a diagram showing the assembler rings 42 and 44, the differential load distribution gear 62 between those rings 42 and the pawls 32 and 33. Obviously, only one of the pawls 32 and one of the pawls 33 are shown for illustrative purposes. FIGS. 10A and 10B and FIGS. 11A and 11B show the assembler ring 42 and associated pawl 32 in the assembler ring 44 and associated pawl 33 side by side so that the relationship between the rings 42 and 44 and pawls 32 and 33 can be more easily shown and explained. FIG. 10A shows that the pawl 32 is engaged with the ring 44 and that the pawl 33 is not engaged with ring 44 because of the orbital position of the assembler rings 42 and 44 with respect to the orbital body 50. FIGS. 11A and 11B show the orbit moved 90° in a clockwise direction. Pawl 33 has arrived at its engagement position not properly aligned with the teeth in the assembler ring 44. In order for the pawl 33 to properly engage now it must force (let us assume) assembler ring 44 to rotate (relative to assembler ring 42) backwards in the direction of arrow C. It should be noted that rotation in the opposite direction may also occur for proper engagement to take place since a chaotic situation governs the actual point of engagement. The operational principles would be the same regardless of in which direction rotation actually takes place. Now pawl 32 should have disengaged from assembler ring 42 but the relative anticlockwise rotation of assembler ring 44 has caused a similar clockwise rotation of assembler ring 42 because of the differential load distribution gear 80 arranged between the assembler rings 42 and 44. This has therefore forced a temporary re-engagement of pawl 32 with assembler ring 42 at the point X shown in FIG. 11A. All of this has occurred without affecting the overall clockwise movement of the assembler rings 42 and 44 caused by the engagement between the rings 42 and 44 by the gears 80. The differential load distribution gears 80 have been used for the subsidiary function of achieving apparently smooth engagement without affecting the overall movement of the transmission. This, the differential load distribution gears 80 in the arrangement shown in FIGS. 6 to 8 as explained with reference to FIGS. 9, 10A, 10B, 11A and 11B provides two degrees of freedom of the differential load distribution mechanism provided by the gears 80. The two degrees of freedom provide the operation of the differential load distribution mechanism (namely the gears 80) to both allow for smooth engagement of the pawls 32 and 33 with the assembler rings 42 and 44 and also the differential load distribution which is required to collapse the partial motion torque functions and allow them to be assembled in a smooth continuous manner as is more fully explained in earlier International Patent Application No. PCT/AU94/00445. Thus, the differential load distribution mechanism in this embodiment provides a further advanced function of not only flattening out the output curve to provide for smooth and continuous output power, but also allows for proper engagement of the sinusoidal teeth on the engagement shoes of the pawls with the sinusoidal teeth of the assembler rings 42 and 44.

The operation of the embodiments of FIGS. 6 and 7 is generally the same as the embodiment of FIGS. 1 and 2. The double orbital motion which is created by the eccentrics 14 and 16 and the orbital control produces a complex orbital and rotary motion from the assembler rings 42 and 44 which ark mounted on the eccentric 14 and the pawls 32 and 33 which are coupled to the orbit body 50 so that the orbit body undergoes the complex rotary and orbital motion. Once again, the orbital control provided by the pins 110 and recesses 124 acts to transform the complex motion so that the orbital motion remains with the orbital body 50 and the rotary motion is supplied to the output shaft 120 so that output power is supplied to the shaft 120.

In this embodiment of the invention, rather than using stationary orbital motion at the carriage 20, a regressive orbital gear system is utilised. The regressive orbital gear system enables the output drive ratio to go through to reverse gear. In this regard, the transmission effectively stops providing output power at the output shaft 120 at a point before the eccentrics 16 and 14 are brought into phase with one another. As the phase relationship passes that point towards phase match between the eccentrics 16 and 14, the regressive gear system 107 and 113 places the transmission into reverse gear so reverse function can take place.

If the regressive gear arrangement referred to above is changed to a progressive gear arrangement by making the gear 111 orbit about the gear 107, then an increase in drive ratio can be obtained. A further increase can be obtained by making the orbital control between the orbital body 50 and flange portion 112 into a progressive gear system rather than a stationary orbiting system as disclosed.

Once again, in this embodiment of the invention, in order to change the drive ratio of the transmission, the phase relationship between the shafts 12 and 13 and therefore the eccentrics 14 and 16 is altered by the phase adjuster mechanism disclosed in the above mentioned Australian patent applications. The radial position of the pawls 32 and 33 need also be adjusted depending on the drive ration which is selected and therefore the position of the control 160 needs to be adjusted as the phase difference between the shafts 12 and 13 is adjusted. This can also be achieved by the phase control mechanism of the aforesaid patents by simply making the phase control mechanism control three shafts, namely the input 12, the input 13 and the control rod 176 instead of just two shafts. Thus, the phase adjustment mechanism can automatically change the phase relationship between the eccentrics 14 and 16 and also cause the rod 176 to rotate to thereby shift the control 160 dependent on the phase relationship between the shafts 12 and 13 to thereby position the pawls 32 and 33 in the correct position for the particular drive ratio to correctly engage with the assembler rings 42 and 44.

Although this embodiment of the invention preferably uses sinusoidal shaped teeth, it is possible other geometric shapes could be used. It is preferred not to use ratchet shaped teeth of the embodiments of FIGS. 1 to 5 because of the difficulty of engagement and sinusoidal or like shaped teeth provide for slippage movement of the gears over one another to effect the counter rotation referred to with reference to FIGS. 11a and 11b which is required to provide good engagement of the pawls 32 and 33 with the rings 42 and 44 which minimises radial forces.

Figure 12:
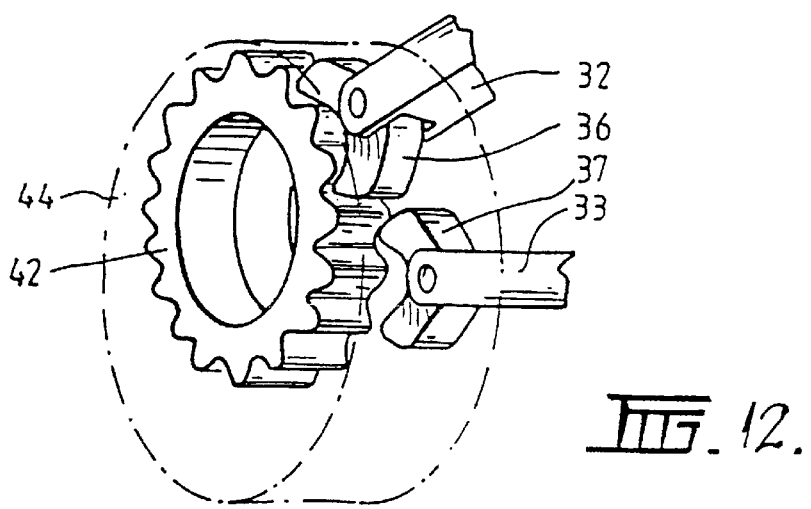
FIGS. 12 to 14 are operational diagrams relating to yet a further embodiment of the invention.
Figure 13:
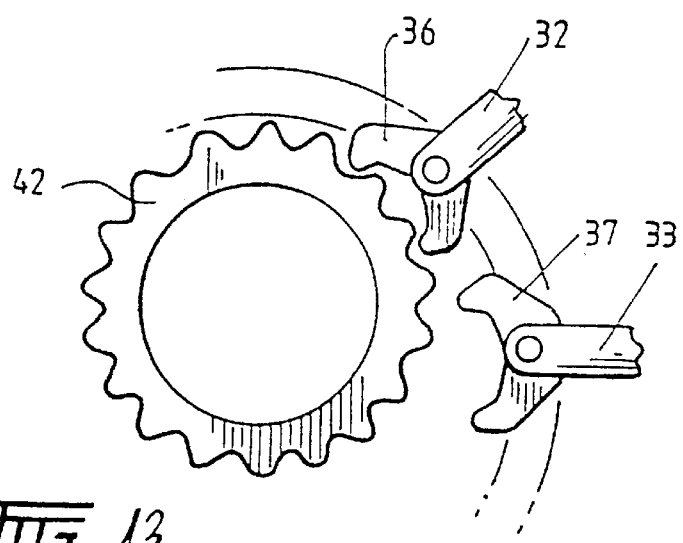
Figure 14:
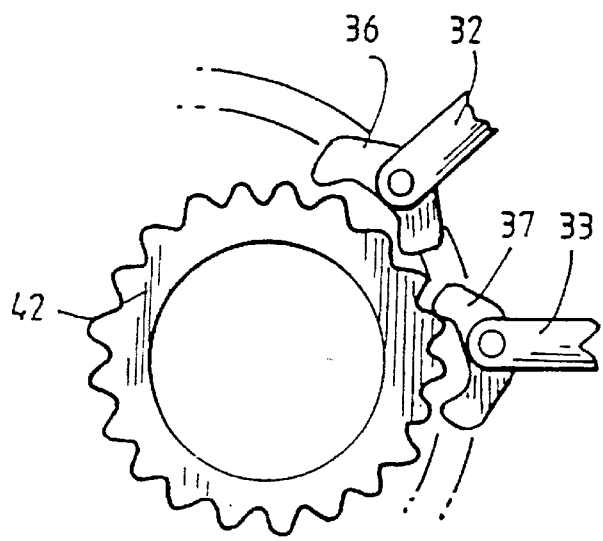

FIGS. 12 to 14 show a further embodiment of the invention in which the pawls 32 and 33 are provided with engagement shoes 36 and 37 of the type described with reference to FIGS. 1 to 5. In this embodiment of the invention, only one degree of freedom is provided for and in this embodiment of the invention, the engagement shoes 36 and 37 may be guided in guide grooves similar to that described with reference to FIGS. 1 to 5 rather than by the type of positive engagement mechanism shown with reference to FIGS. 6 to 9 and sliding movement in the orbiting body. The fact that only one degree of freedom is available in this embodiment means that some kind of backlash or looseness in engagement may be required in order to release sufficient differential load distribution to carry out the primary function of the differential load distribution mechanism in smoothing out the output power supply obtained by the mechanism.

Figure 15:
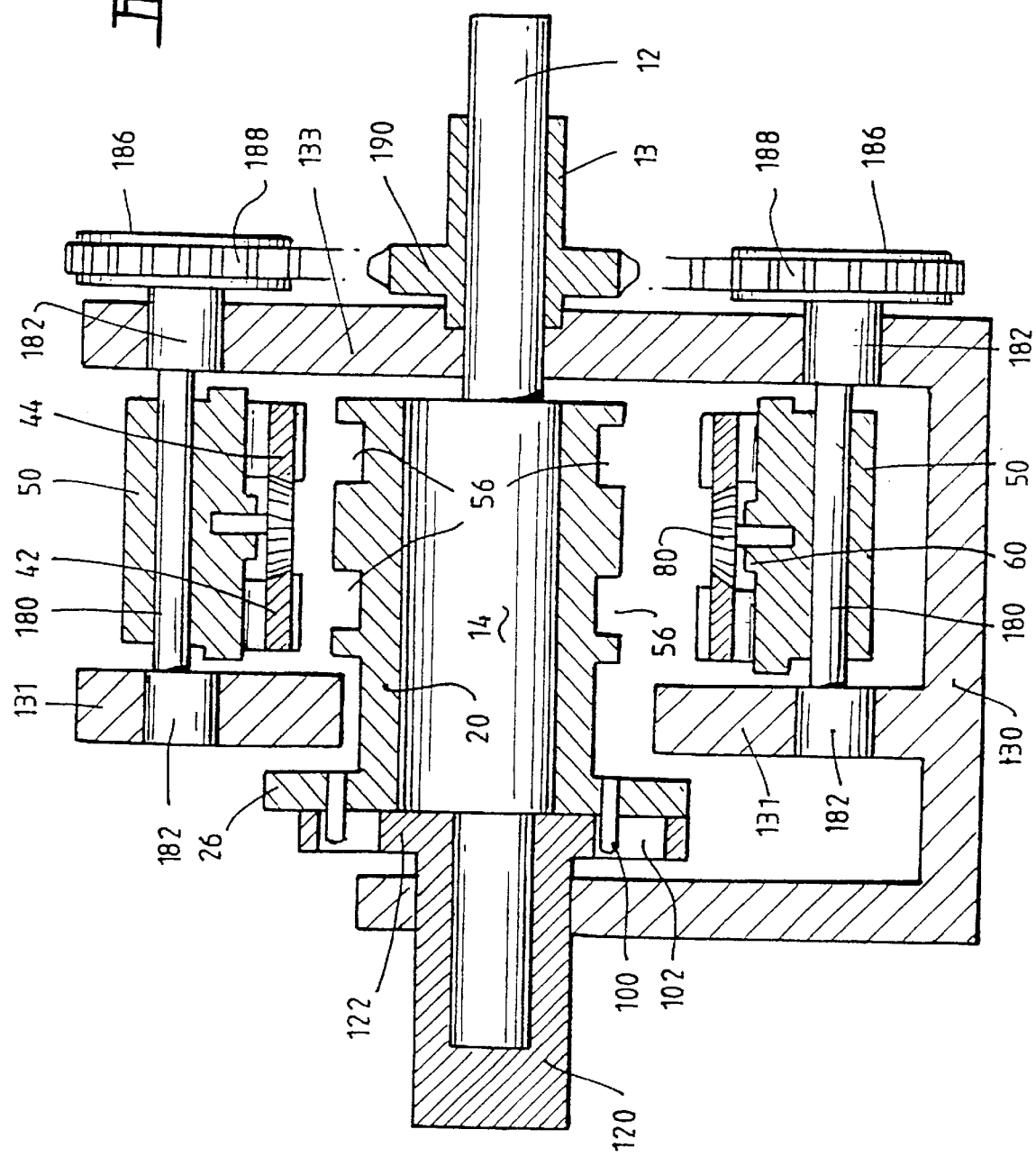
FIG. 15 is a view of a further embodiment of the invention.

FIG. 15 shows a further embodiment of the invention. For ease of illustration some of the componentry has been omitted so as to merely represent the difference between the embodiment of FIG. 15 and the embodiment of FIG. 1.

In this embodiment a first input shaft 12 has a first eccentric 14 and second input shaft 13 surrounds the first input shaft 12. The eccentric 14 has a pawl carriage 20 which has grooves 56 in which the pawls (not shown) identical to pawl 32 and 33 are located. An output shaft 120 includes a flange portion 122 which forms a control plate and the carriage 20 has a flange 26 which forms an epicyclic plate. As in earlier embodiments, pins 100 and recesses 102 are provided for controlling the orbital motion of the carriage 20. The casing or stand 130 includes an annular support section 131 and an end plate 133. Arranged between the annular section 131 of the end plate 133 are a plurality of axles 180, such as four axles (only two of which are shown in FIG. 15). The axles 180 carry eccentrics 182 which are arranged with the annular section 131 and end wall 133.

Orbit body 50 is mounted on the axles 180 and the orbit body 50 supports assembler rings 42 and 44 as in the embodiment of FIG. 1. A guide ring 60 is also fixed to the orbit body 50 and the guide ring 60 carries differential load distribution gears 80 as also described with reference to FIG. 1. The assembler rings 42 and 44 may be guided in the guide rings as also described with reference to FIG. 1.

The axles 180 are provided with sprockets 186 and a chain 188 is arranged out the sprockets 186. The input shaft 13 is also provided with a sprocket 190 which receives the chain 188.

When input power s supplied to the input shafts 12 and 13 in precisely the same manner as described with reference to FIG. 1, the eccentric 14 undergoes controlled orbital motion in view of the fixing of the carriage 20 to the control plate 122 by the pins 110 and recesses 124. The orbit body 50 and the assembler rings 42 and 44 also undergo orbital motion. However, instead of the orbit being produced by a second eccentric as in the embodiment of FIG. 1, the orbit is produced by the axles 180 and the eccentrics 182 so that the two orbital motions cause transmission of power from the input shafts 12 and 13 to the output shaft 120 as in the earlier embodiment except that in this embodiment, the carriage 20 and the pins 100 and recesses 102 which control the orbit of the carriage 20 basically provide the transformer for transforming the complex rotary an orbital motion of the carriage 20 so that the orbital notion remains with the carriage 20 and the rotary motion is supplied to the output shaft 120 to provide output drive.

In this embodiment of the invention, the orbital motion of the orbit body 50 and therefore the assembler rings 42 and 44 is automatically controlled by virtue of the axles 180 and the eccentrics 182 without the need to provide orbital control in the form of the epicyclic plate 26 and associated pins and recesses 100 and 102 or the use of regressive or stationary orbital gears.

The arrangement in FIG. 15 provides a more compact transmission in terms of the axial length of the transmission and locates the pawls and assembler rings 42 and 44 more centrally as compared to the embodiment in FIGS. 1 and 2 where the pawls 32 and 33 and assembler rings 42 and 44 are offset to one side of the transmission. The arrangement in FIG. 15 thereby overcomes problems with torque loading in the transmission and the need for heavy bearings such as the bearings 132 and 108 shown in FIGS. 1 and 2 which are required because of the torque loading in the embodiments of FIGS. 1 and 2.

Instead of using a chain 188 to transmit power from the shaft 13 to the axles 180, solid gearing may be used.

In the preferred embodiments described particularly with reference to FIGS. 3 and 4. The eccentrics 14 and 16 can be brought into phase relationship so that the two orbits match. It will be possible to design the eccentrics so that it is never possible to make the two orbital motions match thereby presenting the transmission from producing drive from the input to the output in the embodiment of FIG. 1.

Figure 16:
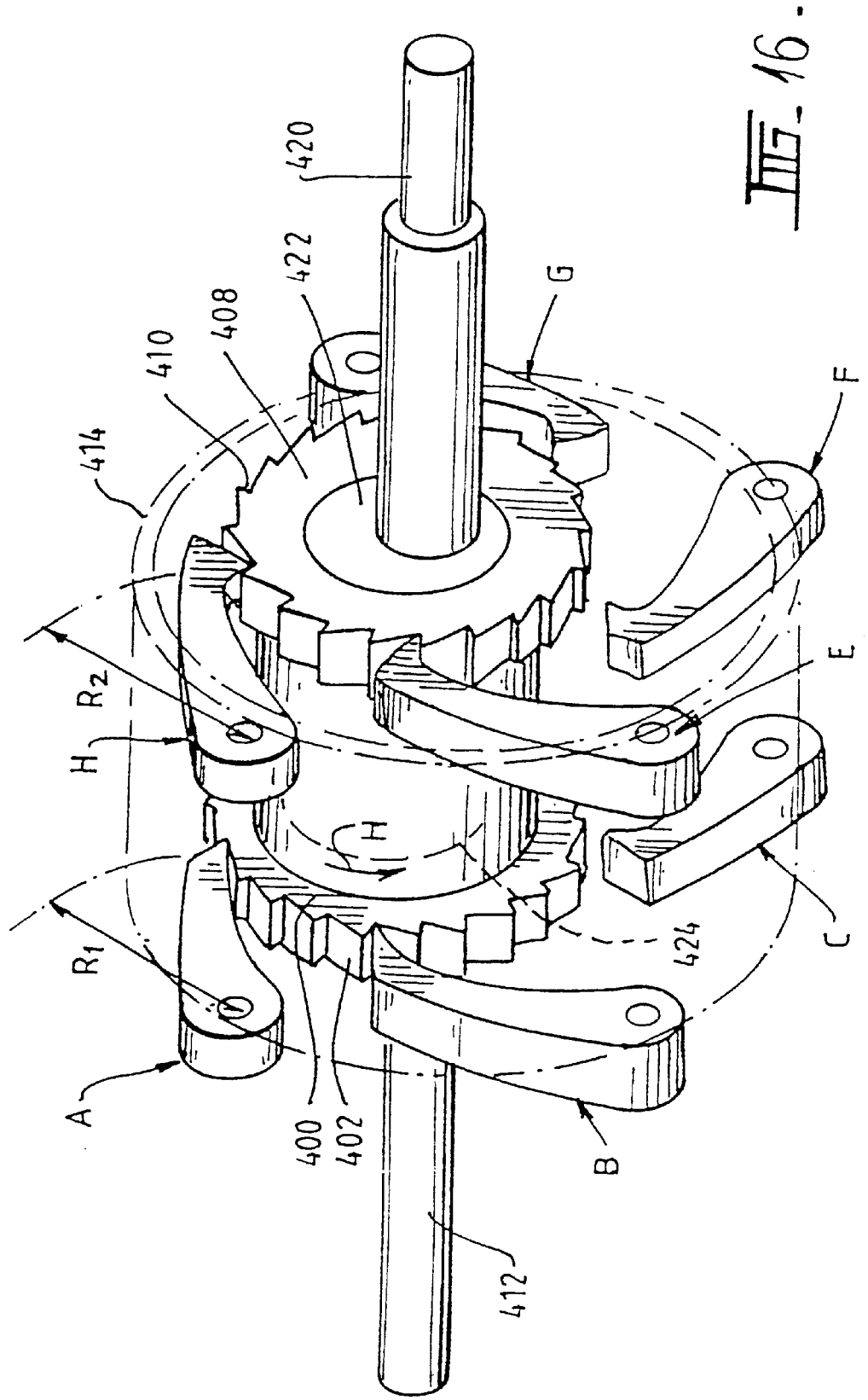
FIG. 16 is a schematic diagram of a transmission according to a further embodiment of the invention.

FIG. 16 shows yet a further embodiment of the invention which is adapted to be driven in both a forward direction and a reverse direction. The diagram is schematic to show the principle of operation of the transmission and uses the double orbit principle described with reference to the previous embodiments.

An assembler ring 400 is provided on an eccentric 422. The assembler ring 400 is a schematic representation of two assembler rings of the type described in FIG. 1 and 6 which have a differential load distribution gear (not shown) arranged between them and which engage two sets of pawls as described in the earlier figures. For simple ease of illustration, the two sets of assembler rings and corresponding two sets of pawls are replaced by a single set in FIG. 16.

Pawls A, B, C (which as noted above, actually represent the two sets of pawls engaging the two assembler rings) engage with teeth 402 on the assembler rings 400 so as to accept the input motion from the assembler rings 400 in the direction of arrow H as the ring 400 orbits in the manner previously described. As is clearly shown in FIG. 16, the pawls A and B are in engagement with the gear ring 400 and the pawl C, together with a further pawl D which cannot be seen in FIG. 16 are not yet engaged with the teeth 402. A characteristic of the driving cycle produced by the interacting orbits of the double orbit system is to produce two drive phases, one on the closest approach side of the inner orbiting body to the outer orbiting body (referred to here as the primary orbit) and on the opposite side (referred to as the counter phase). When the input mechanism, such as input shaft 420 causes the cycle to operate, the output will be driven in the same direction whether the input is turned clockwise or anticlockwise since in one direction pawls will engage the primary phase and in the opposite direction will engage the counter phase. In this embodiment, it is therefore necessary to switch off one phase if the mechanism is to be able to be driven in either direction so that as the second set of pawls begins to operate, there is no destructive interference from the first set as one engages the primary phase and the other engages the counter phase. In this embodiment, the pawls are so arranged or constrained so that they are only able to engage the primary phase in either direction. As explained in earlier embodiments, the pawls A to D are controlled so as to undergo orbital motion and the assembler gear 402 is also controlled to undergo orbital motion so that the schematic gear assembler ring 400 and pawls A, B, C and D will operate precisely as described in the earlier embodiments with the pawls A, B, C and D engaging the teeth 402 and pushing the outer orbiting body 414 to transmit drive through output shaft 412.

According to this embodiment of the invention, the assembly ring 400 is rigidly coupled with a further assembly ring 408 which, once again, is a schematic representation of two assembler rings which are interconnected by a differential load distribution gear in the same manner as the ring 402. Each of the rings designated by the reference 408 have associated pawls E, F, G and H which are facing in the same direction as the pawls A, B, C and D, but the ratchet teeth 410 on the assembler rings 408 face the opposite direction so that the pawls E, F, G and H hook behind the teeth 410 and when the assembler ring 408 rotates in the direction of arrow H would simply ride over the teeth 410, but when assembler ring 408 is caused to execute an orbit in the opposite direction to arrow H the pawls E, F, G and H are driven in the opposite direction will rotate the body 414 in a direction opposite to arrow H.

When drive is transmitted to, for example, shaft 420 and eccentric 422 to cause ring 400 to execute an orbit, the body 414 to which the pawls A, B, C, D, E, F and G are connected will undergo orbital motion and rotate in the direction of arrow H and will provide an output at shaft 420. During rotation in this direction, the engagement between the pawls A to D and the assembly ring 400, will be constrained so as to only engage ring 400 in the region when ring 400 and body 414 are closest. This is regarded as the primary phase of the orbit cycle. It is necessary that both sets of pawls A to D and E to H swing through the same arc, because if they move through opposed arcs and engage two rigidly connected assemblers 400 and 408, movement of the assemblers away from an in phase position would cause a locking up situation as the pawls move to oppose each other, even when both are operating on the primary phase.

The ratchets E to H will simply ride over the teeth 410 of the assembler ring 408 when the input drive 420 and 422 rotate in the direction of arrow H.

If it is desired to transmit drive in the opposite direction, the input 420 and 422 is driven in the direction opposite arrow H so as to cause the body containing rings 400 and 408 to orbit in the opposite direction to arrow H. This will cause pawls A to H to drive body 414 in the direction opposite arrow H. The pawls A to D will simply ride over the teeth 402 but the pawls E to H will engage the teeth 410 and rotate the assembler ring 408 in the direction opposite arrow H to provide drive in the reverse direction to output 412.

The pawls E to H are located a desired distance relative to the orbit executed by ring 408 and body 414 by an adjustment screw or the like so as to make contact with the gearing 408 only when the orbits of the body 414 and the rings 400 and 408 are in phase with respect to one another. The adjustment of the pawls E to H will depend on the drive ratio selected by the eccentricities 422 and 424 and may need to be adjusted slightly as the drive ratio is changed by adjustment of the eccentricities 422 and 424 so that as the drive ratio changes the position of the pawls E to H also changes to maintain the contact only when the two orbital motions are out of phase with respect to one another. Thus, when drive is required in the reverse direction, the pawls E to H and the assembler rings 408 form a counter phase which provides that drive to the output shaft 412.

The radius R1 and R2 of the pawls A to D and the pawls E to H are identical and form between them a virtual gear. The assembly rings 400 and 408 are slightly out of phase with one another so that the slightly out of phase rotating gears 400 and 408 provide an infinitely thin surface defined between the surface of a tooth 402 engaged by, for example, the pawl A shown in FIG. 16 and the surface of a tooth 410 engaged by, for example, the pawl H in FIG. 16. The surface of those two teeth on the respective gear rings therefore form between them a virtual gear with no thickness.

Figure 17:
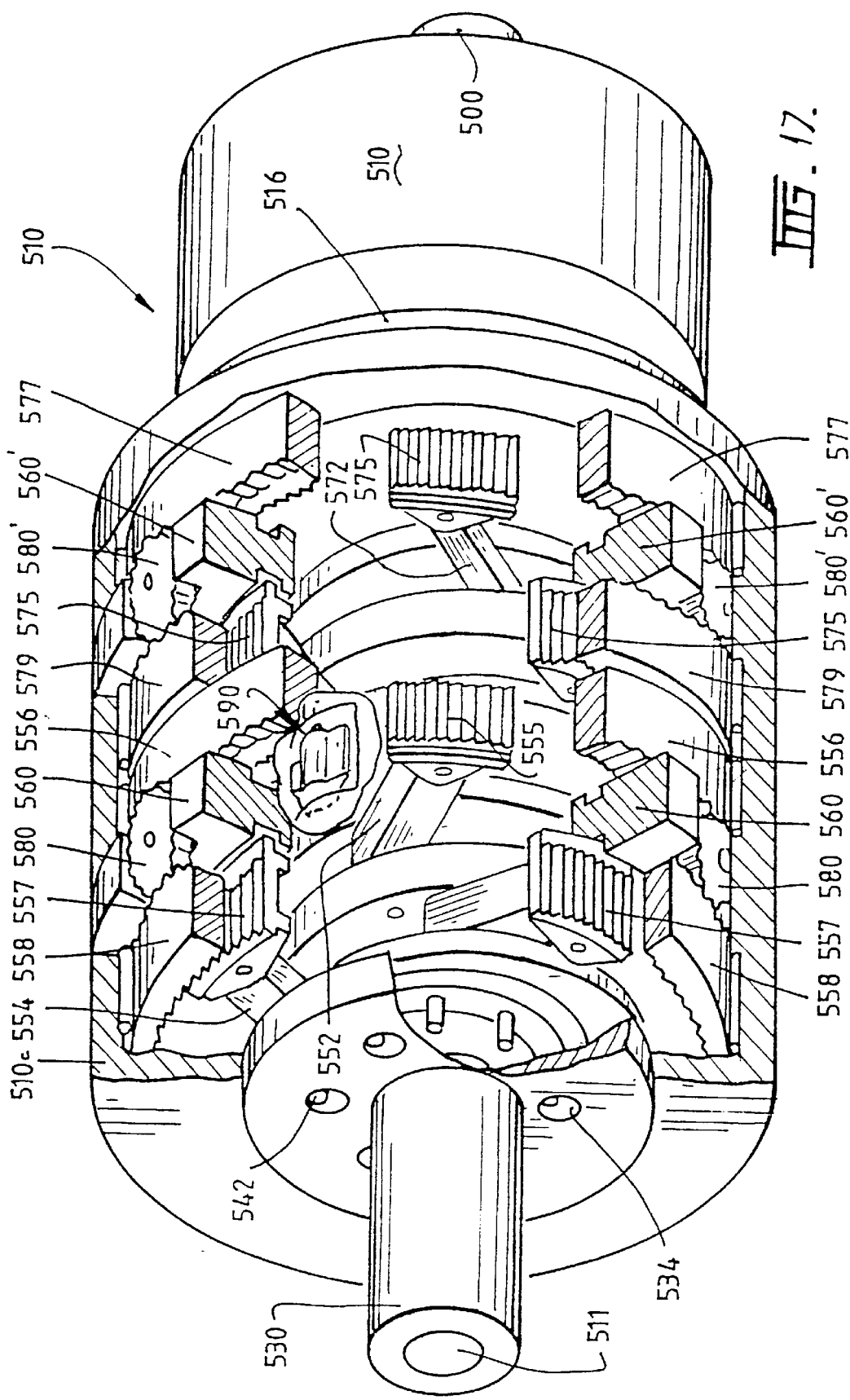
FIG. 17 is a partly broken away perspective view of an embodiment utilising the principles of FIG. 16 and showing additional detail.

FIGS. 17 and 18 show in more detail an embodiment utilising the principles described with reference to FIG. 16.

With reference to FIGS. 17 and 18, an input shaft 500 supplies input rotary power via a phase controller 501. The phase controller 501 is described in our previously mentioned copending international application. The input shaft 500 carries a first eccentric 502. The eccentric 502 has a cutout 503. A second input shaft 504 is mounted on the first input shaft 500 and is also driven via the phase controller 501. The second shaft 504 carries a second eccentric 506. An orbital body 510 is mounted on the eccentric 506. The orbital body 510 has a sleeve portion 510a arranged on the eccentric 506, a radially extending end wall section 510b and an outer diameter cylindrical section 510c. The wall 510b carries pins 512 which are received in an opening 514 of an orbit control plate 516 which is fixed stationary in the casing (not shown) of the transmission of FIGS. 17 and 18.

The input shaft 500 has an end section 511 upon which is mounted an output shaft 530. The output shaft 530 has a flange section 532 which has holes 534. Mounted on the first eccentric 502 is an orbit control cylinder 540. The orbit control cylinder 540 has pins 542 at one end which engage in the openings 534 to control orbital motion of the cylinder 540. Arranged on the cylinder 540 is a forward motion pawl carrier 550 and a separate reverse motion pawl carrier 562. Two rows of pawls 552 and 554 are pivotally coupled on the pawl carrier 550 by pins 553. The pawls 552 carry shoes 555 which engage with assembler ring 556. The pawls 554 carry shoes 557 which engage assembler ring 558. Arranged between the assembler rings 556 and 558 is ring 560 and differential load distribution gear 580. As in previous embodiments, the ring 560 is fixed to the cylindrical portion 510c of the orbital body 510.

The reverse motion pawl carriage 562 also carries two rows of pawls 570 and 572. The arrangement of the teeth of these pawls with respect to the teeth of the pawls on the forward motion carriage 550 is the same as that described with reference to FIGS. 16 to 18. Once again, the pawls 570 and 572 each have a foot 575 which engage assembler rings 577 and 579. A differential load gear 580' and ring 560' are arranged between the assembler rings 577 and 579.

A plurality of forward/reverse motion switches 590 are pivotally mounted on axles 592 in holes in the cylindrical orbit controller 540. The forward motion pawl carriage 550 is provided with ratchet teeth 597 adjacent one edge and the reverse motion pawl carriage 562 is provided with ratchet teeth 599 at its edge adjacent to the pawl carrier 550. The switch 590 has a ratchet tooth 598 for engaging the ratchet teeth 597 and a ratchet tooth 600 for engaging the ratchet teeth 599 depending on the position of the switch 590 as will be described in more detail hereinafter.

The switch 590 is shown in more detail in FIG. 19 and includes a cylindrical body portion 603 which carries at one end the tooth 598 and at its opposite end the tooth 600. It should be noted that the teeth 598 and 600 extend for only part of the length of the cylindrical section 603 so as to engage only the pawl carrier 550 or the pawl carrier 562 as is clearly shown in FIG. 18. The cylindrical section 603 also has an activation tooth or point 605 which extends the entire length of the cylindrical section 603. The cylindrical section 603 has a bore 607 for receiving the axle 592 (not shown in FIG. 21) and a tail 607 extends in a direction opposite to the activation point 605.

In an inactive position, the switch 590 sits in the position shown in FIG. 20 with neither the tooth 598 nor the tooth 600 engaged with its respective ratchet teeth 597 on the carriage 550 or the tooth 599 on the carriage 562. The activation paint 605 is now engaged in both ratchet gears 597 and 599. Depending on the direction of movement of the input 500 and therefore the direction of movement of the ratchet teeth 597 or 599, the switch 590 will be moved so as to engage the tooth 598 with the teeth 597 or the teeth 600 with the teeth 599 so as to effectively lock one of the forward motion pawl carriage 550 or the reverse motion pawl carriage 562 to the orbit control cylinder 540 so as to impart forward motion or reverse motion to the output shaft 530. The other carriage is now released so it can move freely.

For example, if the input shafts 500 and 504 are rotated in a forward direction to impart forward direction motion to the eccentrics 501 and 506 in the direction shown by arrow M in FIG. 22, the ratchet teeth 597 on the pawl carriage 550 will also move in the direction of arrow M so that the ratchet teeth 597 contact activation point 605 to cause the switch 590 to rotate about axle 592 also in the direction of arrow M. As is shown in FIG. 21, this causes tooth 598 to swing upwardly into engagement with the ratchet teeth 597 with the locking tail 607 also engaging the ratchet teeth 597 to lock the switch 590 in the position shown in FIG. 23. Since the tooth 598 is engaged with the teeth 597, the switch 590 therefore effectively locks the pawl carriage 550 to the orbit control cylinder 540. It will be noted that the tooth 600 is not in engagement with the teeth 599 as is clearly shown in FIG. 20 so the reverse motion pawl carriage 562 is not locked to the cylinder 540 and therefore can be moved freely.

Orbital motion is imparted to the forward motion carrier 550 and to the orbital body 510 in the same manner as previously described in view of the orbital control via the pins 542 and openings 534 and pins 512 and opening 514 to execute the complex forward orbital and rotary motion as described with reference to FIG. 1. The reverse motion pawl carriage 562 and associated pawls 570 and 572 behave as per the description of FIG. 16 during forward motion of the transmission shown in FIGS. 17 and 18. Thus, rotary output power is supplied to the output shaft 530 in the manner described in the previous embodiments.

If reverse motion is supplied to the shaft 500 and shaft 504 so that the eccentrics 502 and 506 rotate in the opposite direction shown by arrow N in FIG. 20, the teeth 599 will engage the activator point 605 so as to cause the switch 590 to rotate in the direction of arrow N so tooth 600 engages with one of the teeth 599 and the tail 607 locks against the teeth 599 as shown in FIG. 22. In this position, the tooth 598 is out of engagement with the teeth 597 and the reverse motion pawl carriage 562 is locked to the orbital control cylinder 540. Thus, reverse motion is transmitted through the pawls 570 and 572, the ring 560' and differential load distribution gear 580' to drive the output shaft 530 In the reverse direction. In this direction of motion, the pawls 557 and 552 behave as per the forward motion pawls in FIGS. 16 to 18.

As is apparent from FIG. 18, the cutout 540 and the eccentric 502 is merely to accommodate the switch 590 and to allow the switch 590 to swing on its axle 592 to bring one of the teeth 598 or 600 into engagement with a corresponding one of the teeth 597 or 599 of the pawl carriage 550 or 562. The switch 590 is biased to the middle position shown in FIG. 22 so as to take up the position shown in FIG. 22 when the transmission is not rotating. The pawl will be switched to one of the positions shown in FIGS. 23 or 24 depending on the greatest movement of the corresponding pawl carriages 550 or 562 or the carriage 550 or 562 which is transferring the most torque. Thus, the engagement direction of the switch 590 is simply determined by the direction of movement of the pawl carriages 550 or 562 or the greatest torque applied to one of those carriages.

Since modifications within the spirit and scope of the invention may readily be effected by persons skilled within the art, it is to be understood that this invention is not limited to the particular embodiments described by way of example hereinabove.

The claims defining the invention are as follows:

1. A transmission including:
   an input means;
   an output means;
   a plurality of secondary members for supplying output power for only part of each rotary cycle of the input means;
   power transfer means for engagement with the plurality of secondary members;
   the plurality of secondary members being coupled to one of the input means or the output means and the power transfer means being coupled to the other of the input means or the output means;
   first orbital means for causing the plurality of secondary members to undergo orbital motion;
   second orbital means for causing the power transfer means to undergo orbital motion so the combined orbital motions cause power to be transmitted from the input means to the output means;
   phase changing means for changing the phase relationship of the orbital motions to, in turn, change the drive ratio of the transmissions.

2. The transmission of claim 1, wherein the transmission further includes load distributing means for differentially distributing the load taken by the secondary members between at least two of the secondary members at any one time.

3. The transmission of claim 1, wherein the orbital motion is one of a stationary, progressive or regressive orbital motion.

4. The transmission of claim 1, wherein the secondary members comprise a first set of pawls and a second set of pawls.

5. The transmission of claim 2, wherein the first orbital means comprises a pawl carriage for carrying the first and second sets of pawls, the pawl carriage having an epicyclic plate, an orbital control plate adjacent the epicyclic plate and orbit control means between the orbital control plate and the epicyclic plate.

6. The transmission of claim 5, wherein the orbital control means comprises a hole or recess on one of the orbital control plate or epicyclic plate and pins for engaging the hole or recess on the other of the orbital control plate or epicyclic plate.

7. The transmission of claim 5, wherein the power transfer means comprises a first assembler ring for engaging with the first set of pawls and a second assembler ring for engaging with the second set of pawls.

8. The transmission of claim 7, wherein the first and second assembler rings have ratchet teeth on an inner peripheral surface and the pawls carry shoes which in turn have ratchet teeth for engaging with the ratchet teeth on the first and second assembler rings.

9. The transmission of claim 5, wherein the pawl carriage has an axial portion and the pawls are pivotally coupled to the axial portion of the carriage ring.

10. A transmission including:
    an input means;
    an output means;
    a plurality of secondary members for supplying output power for only part of each rotary cycle of the input means;
    power transfer means for engagement with the plurality of secondary members, the power transfer means comprising a first assembler ring and a second assembler ring;
    the plurality of secondary members being coupled to one of the input means or the output means and the power transfer means being coupled to the other of the input means or the output means;
    first orbital means for causing the plurality of secondary members to undergo orbital motion; and
    second orbital means for causing the power transfer means to undergo orbital motion so the combined orbital motions cause power to be transmitted from the input means to the output means;
    the second orbital means comprising an orbit body for carrying the first and second assembler rings, the orbit body having an epicyclic plate, an orbital control plate adjacent the epicyclic plate and orbit control means between the orbital control plate and the epicyclic plate.

11. The transmission of claim 10, wherein the orbit control means comprises a hole or recess on one of the orbital control plate or epicyclic plate and pins for engaging the hole or recess on the other of the orbital control plate or epicyclic plate.

12. The transmission of claim 1, wherein the input means comprises a first input shaft having an eccentric upon which a pawl carriage is mounted and a second input shaft having an eccentric upon which a orbit body is mounted.

13. The transmission of claim 12, wherein the input means also includes phase control means for controlling the phase relationship between the first and second input shafts and therefore between the first and second eccentrics to in turn control the phase relationship between the first and second eccentrics and therefore the phase relationship between the orbital motions.

14. The transmission of claim 7, wherein the differential load distribution means comprises differential load distribution gears arranged between the first and second assembler rings so that load can be transmitted from the first assembler ring to the second assembler ring and vice verse to thereby differentially distribute load between one of the first set of pawls and one of the second set of pawls at one time.

15. The transmission of claim 8, wherein the engagement shoes are guided in a guide ring arranged between the first and second assembler rings.

16. The transmission of claim 15, wherein the engagement shoes have guide flanges which are received in grooves in the guide ring to thereby guide movement of the engagement shoes relative to the guide ring and the first and second assembler rings.

17. The transmission of claim 14, wherein the differential load distribution gears are mounted on the guide ring and engage bevel teeth on side surfaces of the first and second assembler rings.

18. The transmission of claim 5, wherein positive engagement means is provided for moving the pawls into a position where the two orbits are able to positively cause engagement between the pawls and the assembler rings for any given phase relationship between the orbits.

19. The transmission of claim 18, wherein the assembler rings are mounted on the first eccentric and the pawls are arranged radially outwardly of the assembler rings for engagement with the assembler rings.

20. The transmission of claim 18, wherein the positive engagement means comprises arm members on the pawls and a control body for axial movement relative to the pawls, the control body having wedge-shaped recesses for receiving the arms so that upon axial movement of the control body, the wedge-shaped recesses contact the arms to move the pawl bodies radially to thereby cause positive engagement of the pawls with the assembler rings.

21. The transmission of claim 20, wherein the pawls are supported by the orbit body and the orbit body is provided with openings for receiving the pawls.

22. The transmission of claim 21, wherein control means is provided for axially moving the control body to engage and disengage the pawls with respect to the assembler rings.

23. The transmission of claim 1, wherein the first orbital means includes a first eccentric and orbit control means for controlling the orbital motion and the second orbital means comprises a plurality of axles from which is mounted the power transfer means, the axles having eccentrics and being rotatable to provide controlled orbital motion to cause the power transfer means to undergo orbital motion.

24. The transmission of claim 23, wherein the power transfer means are supported by an orbital body mounted on the axles.

25. The transmission mechanism including:
   an input power supply for supplying input rotary power;
   an output power supply for providing rotary output power;
   a plurality of secondary members arranged between the input power supply and the output power supply for transmitting power from the input power supply to the output power supply, the plurality of secondary members comprising at least a first array, including at least one secondary member, between the input power supply and the output power supply, and a second array including at least one further secondary number between the input power supply and the output power supply, the first and second arrays being in parallel wit respect to one another;
   power transfer means comprising a first assembler ring for engagement with the first array of secondary members, and a second assembler ring for engagement with the second array of further secondary members;
   the secondary members of the first array and the secondary members of the second array being in engagement with respective first and second assembler rings through only part of each rotary cycle of the transmission mechanism; and
   a load distributing gear engaged between the first and second assembler rings for differentially distributing the load taken by the secondary members between the said at least one secondary member of the first array and the at least one further secondary member of the secondary array.

26. The transmission of claim 25, wherein the first and second assembler means are gear rings having gear teeth on radially extending side surface thereof for engagement with the load distribution gear.

27. The transmission of claim 26, wherein the secondary members are arranged radially inwardly of the first and second assembler rings and ratchet gear teeth are provided on an inner peripheral circumference of the first and second assembler rings for engagement with the respective first array of secondary members and second array of secondary members.

28. The transmission of claim 26, wherein the first and second assembler rings are arranged radially inwardly of the secondary members and ratchet gear teeth are provided on an outer circumferential surface of the first and second assembler rings for engagement respectively with the first array of secondary members and second array of secondary members.

29. The transmission of claim 25, wherein the transmission mechanism includes:
   a second plurality of secondary members for supplying output power for only part of each rotary cycle of the input power supply;
   a second transfer means for engagement with the plurality of secondary members;
   the second plurality of secondary members being coupled with the plurality of secondary members for movement with the plurality of secondary members and the second transfer means being integral with or coupled to the power transfer means; and
   the plurality of secondary members and power transfer means engaging and providing drive during rotation in a first direction of the input power supply and the second plurality of secondary members and second power transfer means engaging and providing drive during rotation in an opposite direction of the input power supply.

30. The transmission of claim 29, wherein the plurality of secondary members are constrained so as to only engage the power transfer means in the region when the power transfer means and secondary members are closest during orbital movement of the secondary members and power transfer means.

31. The transmission of claim 29, further comprising first orbital means for causing the secondary members to undergo orbital motion and second orbital means for causing the power transfer means to undergo orbital motion, the first and second orbital means producing a double orbiting system and wherein the double orbiting system produced by the first orbital means and second orbital means provides two drive phases, one on the closest approach side of the orbiting power transfer means to the orbiting plurality of secondary members to produce a counter phase orbit.

32. The transmission of claim 31, wherein the transmission includes means for switching off one of the phases of the transmission to enable drive to be transmitted in either direction so that as the second plurality of secondary members begins to transmit drive, there is no destructive interference from the plurality of secondary members as one engages the primary phase and the other engages the counter phase.

33. A transmission including:
   an input means;
   an output means;
   a first plurality of secondary members for supplying output power for only part of each rotary cycle of the input means in a first direction;
   a second plurality of secondary members for supplying output power for only part of each rotary cycle of the input means in a reverse direction opposite the first direction;

power transfer means for engagement with the first plurality of secondary members and the second plurality of secondary members;

first orbit control means for causing the first and second plurality of secondary members to undergo orbital motion;

second orbital control means for causing the power transfer means to undergo orbital motion so the combined orbital motion causes power to be transmitted from the input means to the output means;

means for selectively allowing supply of power between the first plurality of secondary members and the power transfer means in the first direction and supply of power between the second plurality of secondary members and the power transfer means in the reverse opposite direction or the opposite reverse direction.

34. The transmission of claim 33, wherein the direction control means comprises a switch having an activation point and a first engagement tooth and a second engagement tooth, the switch being pivotally mounted to the first orbital means;

the first and second plurality of secondary members including first and second respective carriers, the first and second respective carriers having teeth for engagement selectively with the first or second tooth of the switch; and upon rotation of the input means in the first direction, the teeth of the carriage carrying the first plurality of secondary members engage the activation point of the switch to pivot the switch to cause the first tooth to engage with the teeth of the carriage so as to lock the first carriage to the first orbit control means; and upon rotation of the input means in the reverse opposite direction the teeth of the second carriage engage the activation point to pivot the switch to cause the second tooth to engage with the teeth of the second carriage to lock the second carriage to the first orbital means.

35. The transmission of claim 33, wherein the first orbital means comprises a orbit control cylinder coupled with the output means.

36. The transmission of claim 35, wherein the orbit control cylinder is mounted on a first eccentric which in turn is mounted on the input shaft.

37. The transmission of claim 33, wherein the plurality of first secondary members comprises two sets of pawls.

38. The transmission of claim 33, wherein the second plurality of secondary members comprises two sets of pawls.

39. The transmission of claim 33, wherein the power transfer means comprises first and second pairs of assembler rings, each pair of assembler rings having a differential load distribution gear arranged therebetween for differentially distributing load between a pawl in the first set of pawls and the second set of pawls of each of the first plurality of secondary members and second plurality of secondary members.

40. The transmission of claim 39, wherein the second orbit means comprises an orbit body carrying the first and second assembler rings.

41. The transmission of claim 40, wherein the differential load distribution gears are coupled to the orbit body.

* * * * *